(12) United States Patent
Hirosawa et al.

(10) Patent No.: US 6,628,244 B1
(45) Date of Patent: Sep. 30, 2003

(54) DISPLAY DEVICE ARBITRARILY ATTACHABLE TO AND DETACHABLE FROM OTHER DISPLAY DEVICES

(75) Inventors: Masashi Hirosawa, Tenri (JP); Masafumi Yamanoue, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/512,649

(22) Filed: Feb. 24, 2000

(30) Foreign Application Priority Data

Feb. 25, 1999 (JP) .............................. 11-048009

(51) Int. Cl.[7] .............................................. G09G 5/00
(52) U.S. Cl. ......................................... 345/2.3; 345/1.1
(58) Field of Search .......................... 340/706; 345/1.1, 345/121, 2.3; 40/605; 359/142, 143; 361/681, 683; 235/380

(56) References Cited

U.S. PATENT DOCUMENTS

| | | | | |
|---|---|---|---|---|
| 5,049,862 A | * | 9/1991 | Dao et al. | 340/706 |
| 5,253,139 A | * | 10/1993 | Satou | 361/681 |
| 5,467,102 A | * | 11/1995 | Kuno et al. | 345/1 |
| 5,534,888 A | * | 7/1996 | Lebby et al. | 345/121 |
| 5,537,766 A | * | 7/1996 | Nickens et al. | 40/605 |
| 5,781,321 A | * | 7/1998 | Kobayashi | 359/143 |
| 5,805,415 A | * | 9/1998 | Tran et al. | 361/681 |
| 5,949,565 A | * | 9/1999 | Ishida | 359/154 |
| 5,986,622 A | * | 11/1999 | Ong | 345/1 |
| 6,049,450 A | * | 4/2000 | Cho et al. | 361/683 |
| 6,219,164 B1 | * | 4/2001 | Morgaine | 359/142 |
| 6,222,507 B1 | * | 4/2001 | Gouko | 345/1 |
| 6,229,502 B1 | * | 5/2001 | Schwab | 345/1 |
| 6,234,389 B1 | * | 5/2001 | Valliani et al. | 235/380 |
| 6,297,785 B1 | * | 10/2001 | Sommer et al. | 345/1 |

FOREIGN PATENT DOCUMENTS

| | | |
|---|---|---|
| JP | A4355786 | 12/1992 |
| JP | Y2620189 | 5/1994 |

* cited by examiner

Primary Examiner—Steven Saras
Assistant Examiner—Srilakshmi K. Kumar
(74) Attorney, Agent, or Firm—Birch, Stewart, Kolasch & Birch, LLP.

(57) ABSTRACT

A display device includes a data acquiring unit for acquiring data, a display unit for displaying data acquired by said data acquiring unit, an operation unit for operating the display device, a controller for controlling the display device, a communication unit for communicating with other display devices, and a coupling unit for structurally coupling the display device with other display devices with which communication is made by the communication unit. Accordingly, a plurality of display devices capable of individually operating can be coupled or decoupled in a flexible manner, and display contents can be updated to be displayed such that they are consistent with each other even if the display devices are coupled or decoupled.

7 Claims, 26 Drawing Sheets

DISPLAY DEVICE ARBITRARILY ATTACHABLE TO AND DETACHABLE FROM OTHER DISPLAY DEVICES

BACKGROUND OF THE INVENTION

1. Field of the Invention

The present invention relates to display devices for displaying data. In particular, the invention relates to display devices which can be attached to and detached from each other.

2. Description of the Background Art

Japanese Utility Model Publication No. 6-20189 discloses a folding type electronic book of interest to the present invention. According to this publication, a plurality of display devices are coupled by elastic members placed therebetween.

Japanese Patent Laying-Open No. 4-355786 discloses a display system having a plurality of display devices which are stacked on each other and bound together along one side. In this system, display can be continued even if any display device is detached.

Further, there is a conventional system of communicating data and control instructions between a plurality of terminals. In one conventional system, for example, WWW (World Wide Web) browsers are operating on two computers respectively, with one WWW browser transmitting a URL (Uniform Resource Locator) to the other WWW browser through a TCP/IP (Transmission Control Protocol/Internet Protocol) and the other WWW browser receiving and displaying the URL.

Disadvantageously, the display devices disclosed in Japanese Utility Model Publication No. 6-20189 are coupled by the elastic members provided therebetween, and accordingly it is difficult to hold the coupled devices in the air in a stable manner. In addition, the publication just shows the physical structure of the folding type electronic book and communication between the coupled devices is impossible according to this.

According to Japanese Patent Laying-Open No. 4-355786, the display devices disclosed therein are detachable while the displayed contents cannot be adjusted between those display devices so that update of the displayed contents to new data is impossible, for example.

The system of communicating URLs between WWW browsers and displaying them usually operates between computers connected by a network cable. Therefore, if this system is applied to a small size display device such as an electronic book for portable use, this system would have disadvantages like those of Japanese Utility Model Publication No. 6-20189.

SUMMARY OF THE INVENTION

One object of the present invention is to provide a display device which can operate independently, while a consistent display is possible even if a plurality of display devices of such type of display device are connected to or separated from each other for use.

Another object of the present invention is to provide a display device capable of displaying successive pages in order even if the number of display devices connected thereto varies.

Still another object of the present invention is to provide display devices easily connected to each other.

A further object of the present invention is to provide display devices which can be connected to each other in which there are fewer restrictions on the location of installation.

Those objects would be achieved by a display device including following components. Specifically, the display device includes a data acquiring unit for acquiring data, a display unit for displaying data obtained by the data acquiring unit, an operation unit for operating the display device, a controller for controlling the display device, a communication unit for communicating with another display device, and a coupling unit for structurally coupling the display device to the another display device with which communication is made by the communication unit.

According to the present invention, the coupling unit effectively enables a plurality of coupled display devices as a whole to be held stably in the air. Particularly in the application of display devices to an electronic book formed of two display devices to be opened for use, if the two display devices coupled to communicate with each other are not coupled stably, the electronic book thus formed cannot be held with one hand as the normal books, which is highly inconvenient for use. Therefore, depending on the applied field, it is extremely advantageous to couple display devices which communicate with each other.

The display devices coupled to each other are adapted to display respective pages which are successive in order. Even if the number of coupled display devices is dynamically changed, there would be no missing page or the pages would not be displayed in reverse order and the pages can thus be displayed consecutively.

The display device can acquire data from another display device coupled thereto. Therefore, the display device can obtain only the necessary data from the coupled display device and thus those display devices can advantageously share data. For example, if the display devices are applied to the electronic book, it is useless to store the same data in respective display devices. Although purchase of data for each device is necessary if the data is sales data, the data to be purchased may be just one if the data is shared and just a required data is transmitted. It could be possible to copy all data in one device into other display devices in advance. However, transmission of data which will not be displayed is useless. By transmitting just necessary data, the amount of communicated data would effectively be reduced.

According to the present invention, the coupling unit and the communication unit may be integrated. In this way, the user can readily connect the devices. Further, reduction of the number of components is possible to achieve advantages concerning the cost and maintenance.

Preferably, radio or optical communication is performed by the communication unit.

Since communication can be made between display devices by the radio communication, the radio waves can be transmitted through a thin plate, for example, and accordingly there are fewer restrictions on the location of installation and the communication unit can be installed within the display device. In addition, the use of the radio communication can eliminate defective contact which occurs when physical connection is employed such as cable.

Since communication can be made between display devices by optical communication, higher directivity than that of the radio communication using low frequencies hinders leakage of communication contents.

Preferably, communication units are located on both sides of the display device.

Communication modules can accordingly be attached on both sides of the display device. Therefore, at least three display devices can connect to each other side by side to communicate with each other and thus provide consistent display contents. Increase or decrease in number of the display devices is possible by connection and disconnection thereof as required.

According to an aspect of the invention, if the display device is newly coupled to or decoupled from other display devices, the coupling unit, the communication unit and the controller automatically inform all the display devices as to coupling or decoupling thereof when the coupling or decoupling is made.

Since the coupling and decoupling status can thus be conveyed to all display devices automatically, the display devices can all recognize which display device is coupled currently and thus can correctly designate a particular device to which control instructions should be transmitted. Further, when consecutive data are to be displayed in order by a plurality of coupled display devices respectively, the subsequent data can be displayed properly as the accurate number of coupled devices is known in real time.

According to another aspect of the invention, when the display device is rotated to be coupled to another display device by the coupling unit, the display unit rotates display contents and the controller changes its function to establish agreement between location and direction before rotation and those after rotation.

When the display device is rotated to be coupled to another display device, contents displayed on the display unit are rotated and the function of each input unit is changed to make agreement between the location and direction before rotation and those after rotation. Therefore, the resultant display status is natural for the user to enable the user to operate the device conveniently.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention are hereinafter described in conjunction with the drawings.

Figure 1:
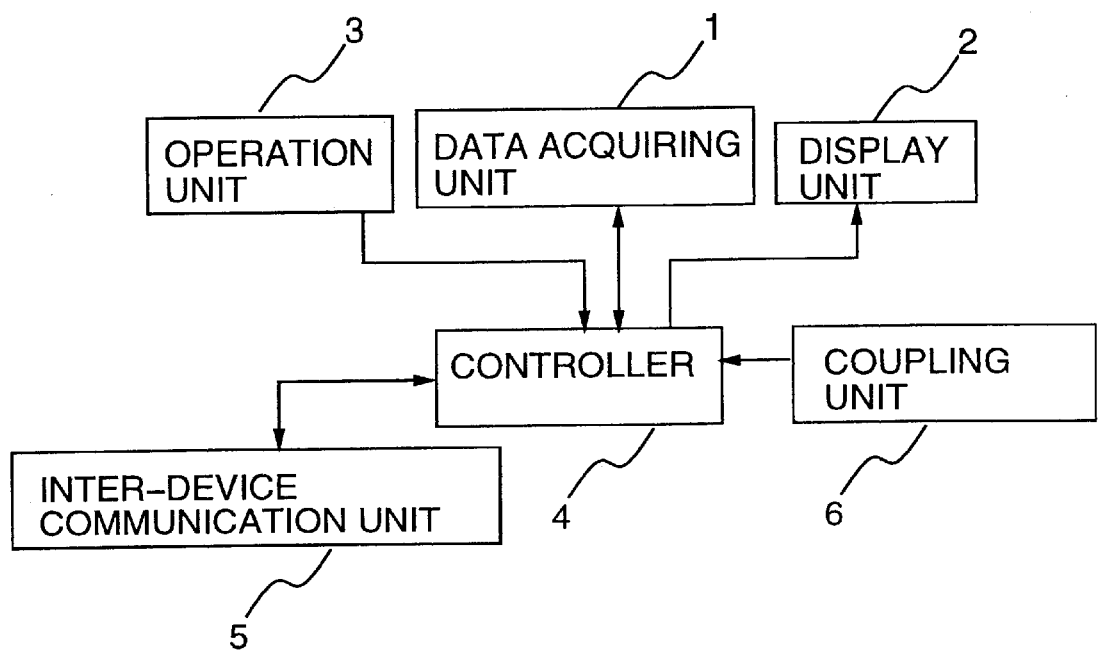
FIG. 1 is a block diagram illustrating a display device in one embodiment of the invention.

Referring to FIG. 1 illustrating a display device, a data acquiring unit 1 acquires data. The data thus acquired is transmitted to a controller 4. A display unit 2 displays the data obtained from controller 4. An operation unit 3 conveys an input operation done by the user or the like to controller 4. Controller 4 controls data acquiring unit 1, display unit 2, an inter-device communication unit 5 and a coupling unit 6. It is noted "control" here includes communication of data. Inter-device communication unit 5 communicates with another display device coupled thereto. Coupling unit 6 establishes a structural coupling to another display device Data acquiring unit 1 can be implemented by using a memory and a magnetic recording device provided within the display device. It may alternatively be implemented by using media and drive such as memory card and CD-ROM detachable from the display device. It may also be implemented by a method of using a communication interface such as modem and Ethernet in order to acquire data on an external server through the communication interface. Further, as another method of implementing data acquiring unit 1, inter-device communication unit 5 may be used as a communication interface so as to acquire data from a display device with which communication is made. Details of communication and an operation of data acquiring unit 1 will be described respectively in conjunction with FIG. 15 and FIG. 22.

Figure 2:
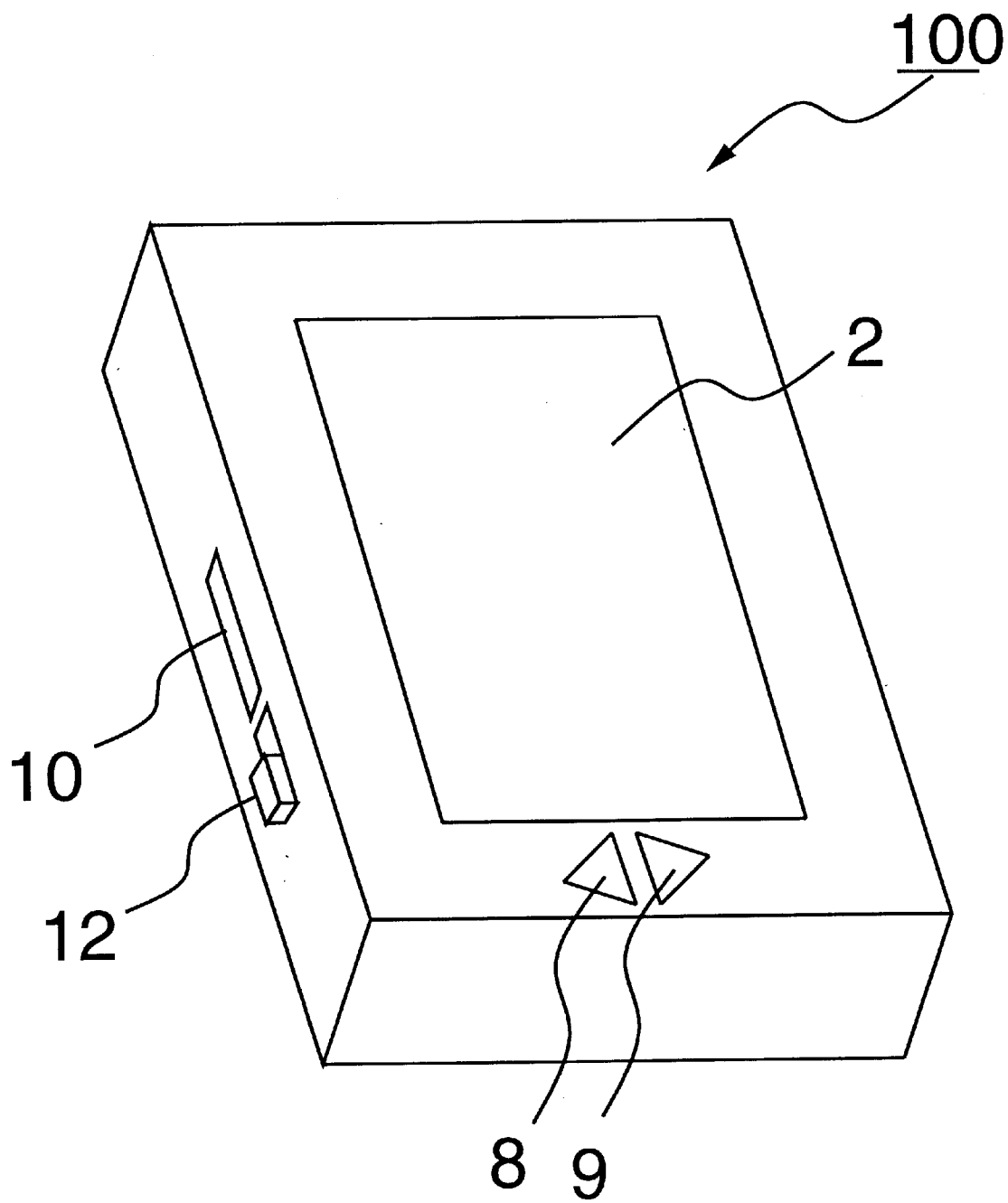
FIG. 2A illustrates an exterior view of the display device and FIG. 2B illustrates a coupling unit.
Figure 2:
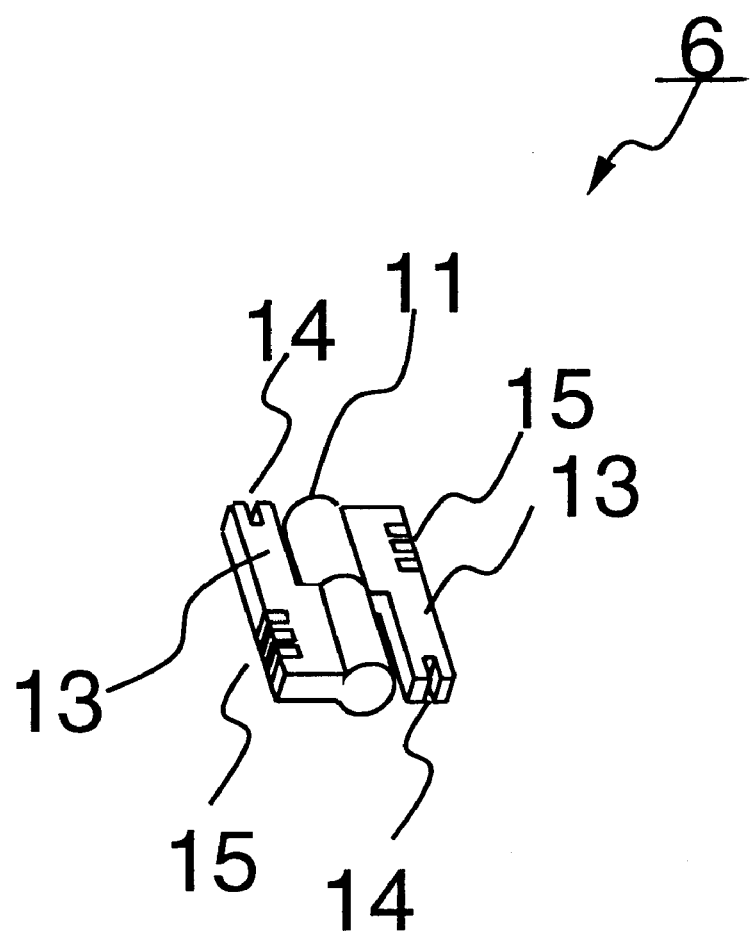

FIG. 2A illustrates an external view of a display device 100 according to the present invention. Referring to FIG. 2A, display unit 2 of display device 100 can be implemented as a flat display such as liquid crystal display and plasma display. CRT may alternatively be used. Display unit 2 displays data obtained from controller 4. The data displayed is the one which has been developed on a memory or the like by controller 4 according to the display size and the number of colors of display unit 2. Suppose that display unit 2 is 800×600 in size and a gray representation with 256 gradations is possible on display unit 2, for example. One byte of data is required to display one pixel and accordingly data of 800×600=480,000 bytes in total are required. The data are transmitted to display unit 2 in raster order and display unit 2 in turn stores the transmitted data in a VRAM (Video Random Access Memory) or the like so as to display the data in the VRAM on a liquid crystal display or the like.

Figure 3:
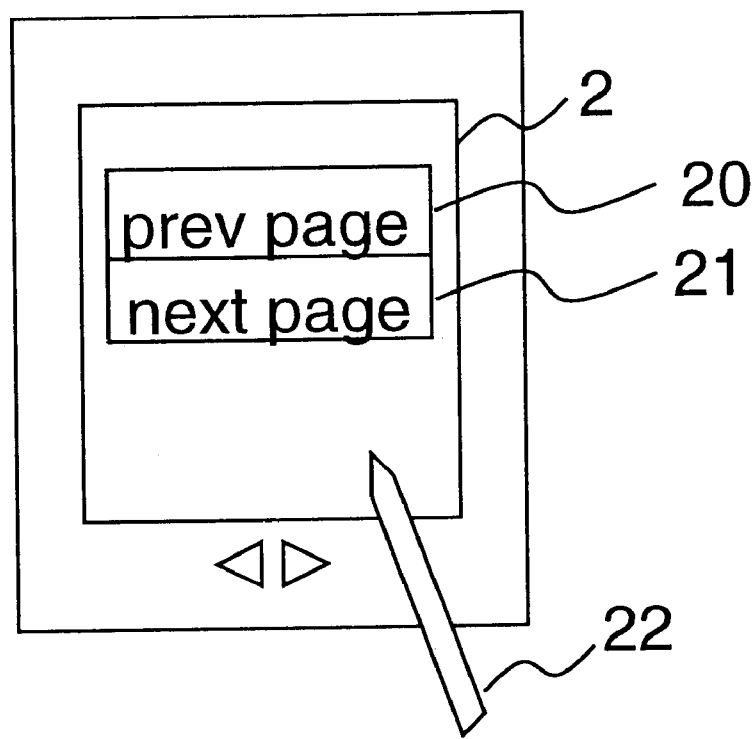
FIG. 3 illustrates an operation unit implemented by a software menu.

Operation unit 3 conveys to controller 4 an input operation by the user. Operation unit 3 is mounted in FIG. 2A as buttons 8 and 9. If contents data of an electronic book, for example, is displayed, buttons 8 and 9 may be pressed to turn the page back or forth to the preceding or following page. The buttons may not be actual buttons and alternatively selection may be made from a software menu as shown in FIG. 3. FIG. 3 shows a software menu screen denoted by 20 and 21 displayed on display unit 2. If a tablet unit is overlaid on display unit 2, a tablet pen 22 can be used to make selection from the menu. Instead of the operation by the user, an operation signal from external equipment may be supplied to be transmitted to controller 4 or the operation may be done automatically. For example, a circuit or program may be provided which automatically enables an operation of "proceeding to the next page" at an interval of ten seconds.

FIG. 2B illustrates an example of coupling unit 6. Coupling unit 6 has a coupling hinge portion 11 fitted in a coupling hole 10. Coupling hinge portion 11 can be bent freely at its mandrel as a center. Two display devices coupled to each other can accordingly be bent at any angle for use like a book.

Figure 4:
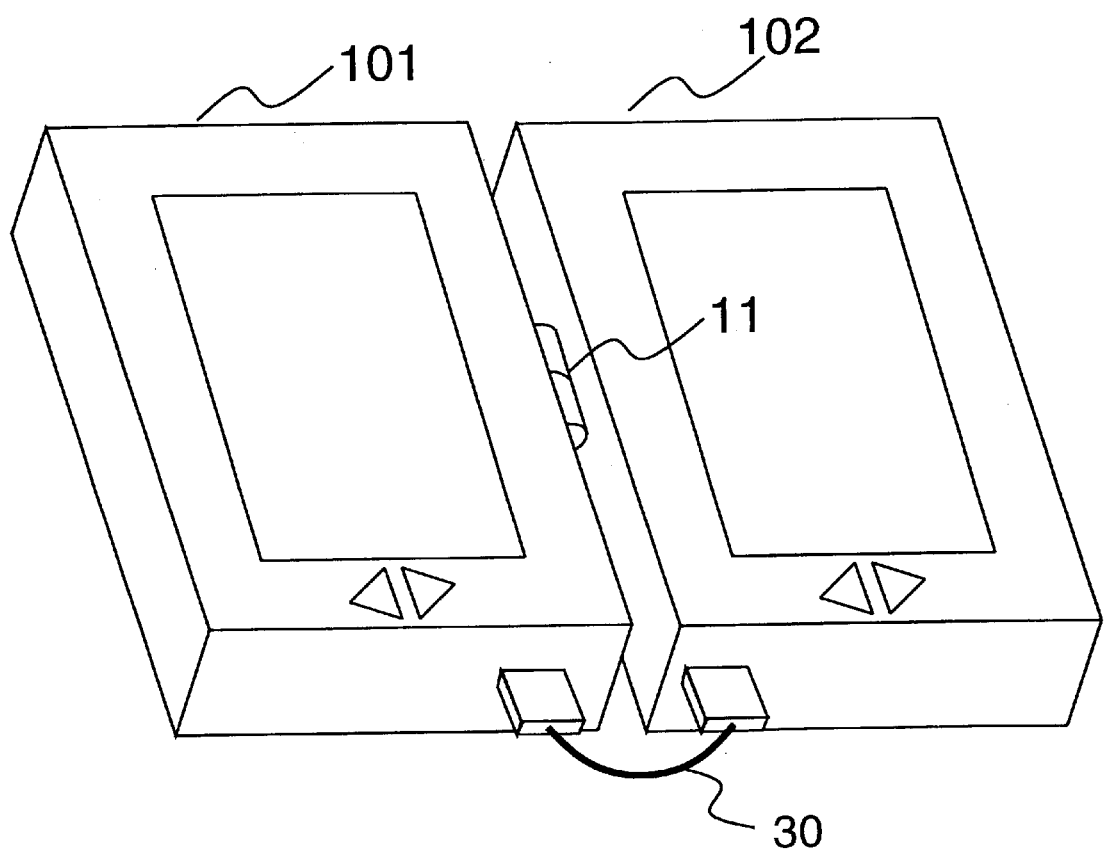
FIG. 4 illustrates two display devices coupled at 180°.
Figure 5:
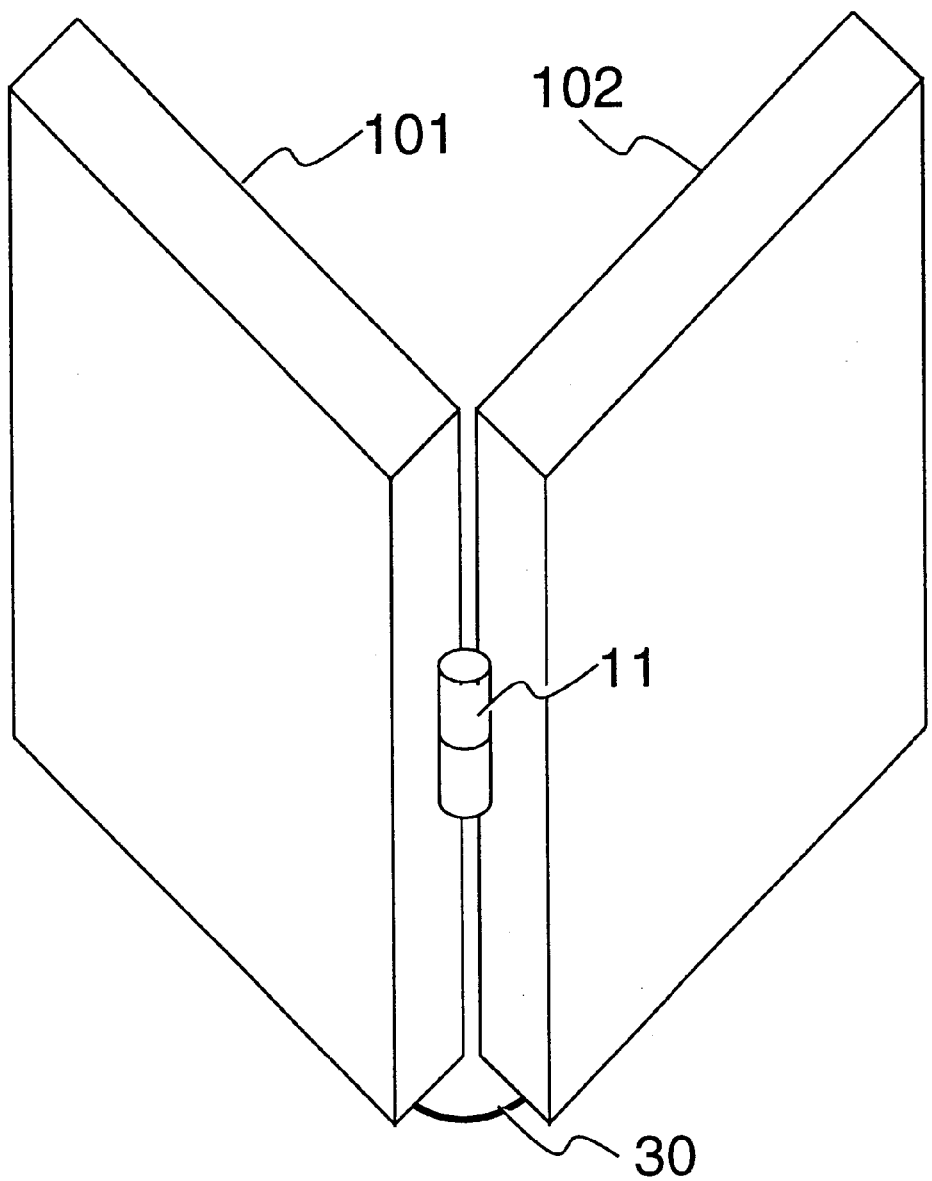
FIG. 5 illustrates two display devices coupled at 90°.

FIG. 4 illustrates two display devices 101 and 102 coupled at 180°. FIG. 5 illustrates display devices 101 and 102 shown in FIG. 4 that are coupled at 90°. FIG. 5 shows the rear side of the display devices for presenting a clear view of coupling hinge portion 11. If bending of coupling hinge portion 11 is unnecessary, it may just be shaped as a sheet instead of a hinge.

It is a blade-like portion 13 of coupling hinge portion 11 shown in FIG. 2B that is actually fitted into coupling hole 10. A lock mechanism may be provided for preventing coupling hinge portion 11 from easily dropping off after the display devices are coupled. For example, a slide lock 12 is attached next to coupling hole 10 and slide lock 12 is slid to allow a rod-like section to transversely enter coupling hole 10 or leave therefrom. A lock slot 14 is formed in blade-like portion 13. In this way, slide lock 12 is slid after coupling of the display devices for locking or unlocking.

Although coupling unit 6 and the main body of display device 100 separate from each other in FIGS. 2A and 2B, one blade-like portion 13 may be integrated into the display device. In this case, the other blade-like portion 13 which is usually exposed may be bent to be concealed in the main body of the display device. Further, although two display devices are shown as being detachable by the coupling unit, those display devices may originally be coupled and not be detachable. In addition, a push button may be placed deep inside coupling hole 10 or slide lock 12 may have a switch function. In this case, controller 4 may be adapted to inform if the display devices are coupled or not.

Inter-device communication unit 5 enables coupled display devices to communicate with each other. In FIGS. 4 and 5, a communication path is established by a cable 30. Inter-device communication can be realized by employing such a communication standard as RS-232C, USB (Universal Serial Bus) and IEEE-1394. If the standard like USB and IEEE-1394 having a hot plug function is used, it is automatically known whether display devices are coupled or not without using coupling hole 10 or slide lock 12. Even if the standard does not have the hot plug function, a specific terminal may be pulled up at one display device and a terminal at the other display device may be grounded so as to cause the voltage of the specific terminal to drop to the ground when the display devices are connected. Whether or not connection is made can be determined by checking the voltage of that terminal.

Coupling unit 6 and inter-device communication unit 5 may be integrated. A plurality of terminal portions 15 attached onto blade-like portion 13 in FIG. 2B and terminals associated with terminal portions 15 provided in coupling hole 10 would be equivalent to the cable connection.

The communication may be radio communication. There are various methods of implementing the radio communication. For example, a communication module such as radio LAN (Local Area Network) may be used as it is. Since the radio LAN has already been provided with the TCP/IP level, just an upper protocol may be considered if the radio LAN is employed. Description as to the upper protocol will be presented later in conjunction with FIG. 15.

As another example of inter-device communication unit 5, inter-device communication unit 5 can be provided within the display device by using the radio communication. If the radio communication is made in a frequency range which is not so high as that of optical communication, the directivity is not so high and the radio wave can be transmitted through a thin plate or the like. Therefore, restrictions on the location of installation are reduced.

Further, optical communication may be used as the radio communication. The optical communication uses an optical cable in some cases, and this can be regarded as the one similar to the cable communication discussed above regarding inter-device communication unit 5. Here, the optical communication is implemented directly through the air without cable. Infrared radiation which is often used by a remote controller or the like is employed as a representative frequency band. If the infrared radiation is used for communication, IrDA (Infrared Data Association) or the like which is frequently utilized for communication between personal computers or PDAs (Personal Digital Assistants) may be employed as a lower communication protocol in order to realize automatic recognition of any coupled display device as well as low-level data transmission and reception. Optical communication using the infrared radiation is now described below.

Figure 6:
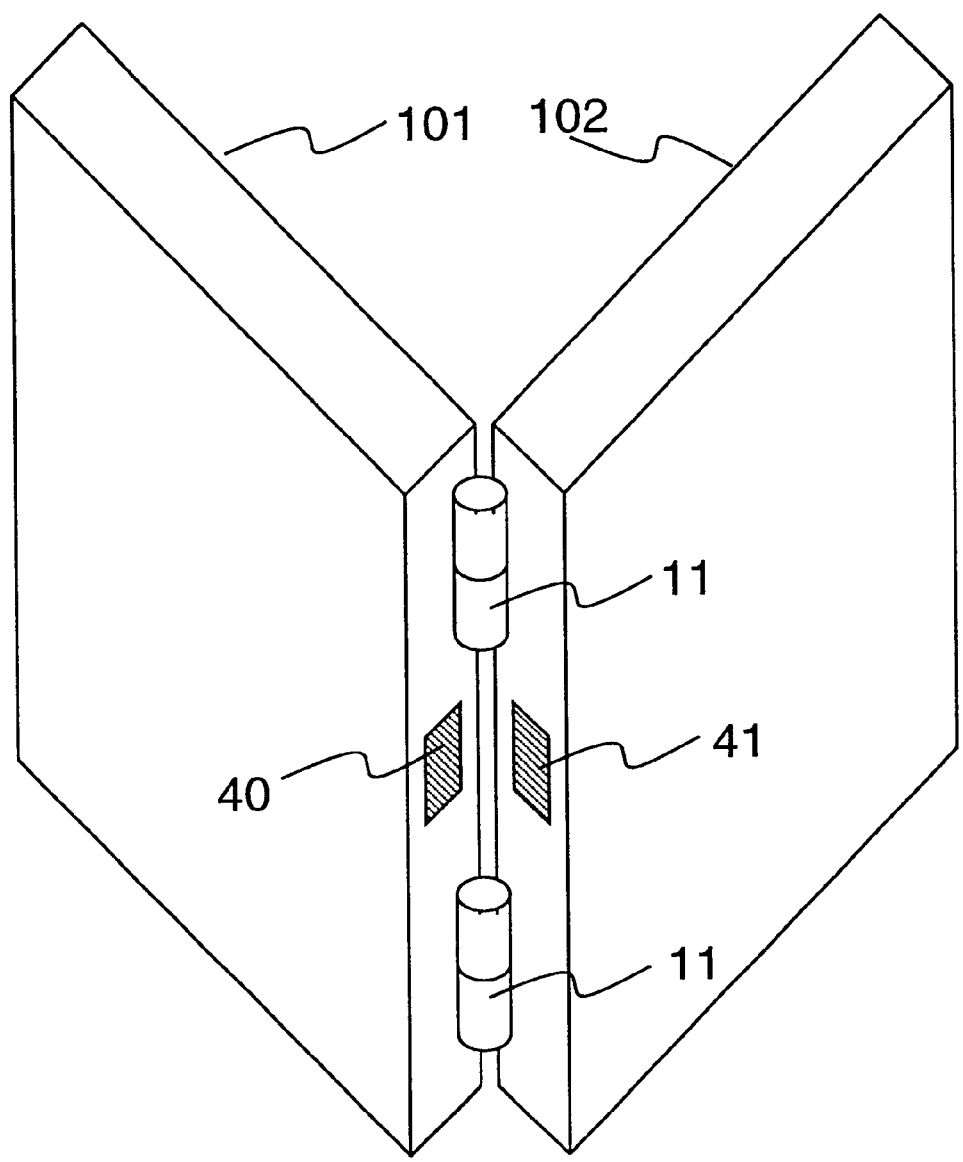
FIG. 6 illustrates the display device with an infrared communication module incorporated therein.

FIG. 6 illustrates display devices 101 and 102 in which infrared communication modules are incorporated. Although there is no cable, the arrangement in FIG. 6 corresponds to the rear side shown in FIG. 5. Infrared communication modules 40 and 41 are each located at the center of the side surface of each of the two display devices where coupling is made. Due to the high directivity, infrared communication modules 40 and 41 must be arranged almost face-to-face. Although FIG. 6 shows the infrared communication modules arranged about the center and thus two coupling hinge portions 11 are respectively located on the upper and lower sides thereof, the position of the infrared communication modules is not limited to the central location and the arrangement of the coupling hinge portions is not limited to the one shown in this example.

Figure 7:
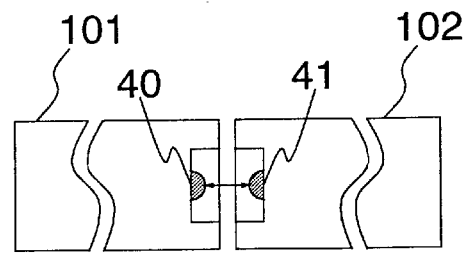
FIGS. 7A to 7C illustrate display devices coupled at various angles with respective infrared communication modules arranged accordingly.
Figure 7:
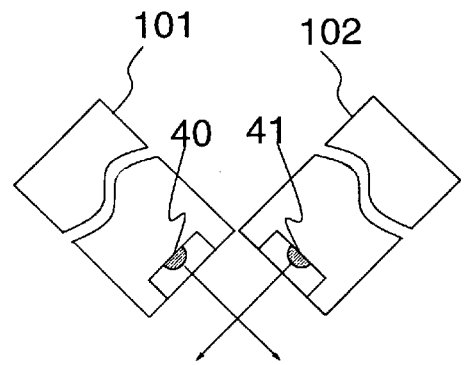
Figure 7:
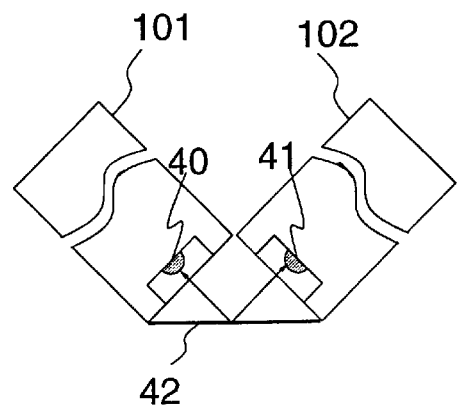

FIGS. 7A to 7C are cross sectional views through infrared communication modules 40 and 41 in FIG. 6, illustrating that display devices 101 and 102 are coupled at various angles and resultant change in the arrangement of the infrared communication modules. It is noted that the coupling portion is expanded for illustration and other components of the display devices are not shown here (corresponding to the wavy lines in the drawings).

In FIG. 7A, two display devices are coupled at 180° as shown in FIG. 4 and accordingly they are flat as a whole. In this case, optical axes of infrared communication modules 40 and 41 face each other. Therefore, communication can be made appropriately.

In FIG. 7B, two display devices are coupled at 90° as shown in FIG. 5 and thus they are bent as a whole to form a right angle. In this case, optical axes of infrared communication modules 40 and 41 are orthogonal to each other. Therefore, communication is difficult in this state due to the problem of the directivity.

FIG. 7C shows display devices in FIG. 7B with a reflection plate 42 added. Here, although the optical axes of infrared communication modules 40 and 41 are orthogonal to each other, reflection occurs owing to reflection plate 42 so that communication is possible. By incorporating the reflection plate, communication can be continued even if the angle of coupling between display devices varies.

Figure 8:
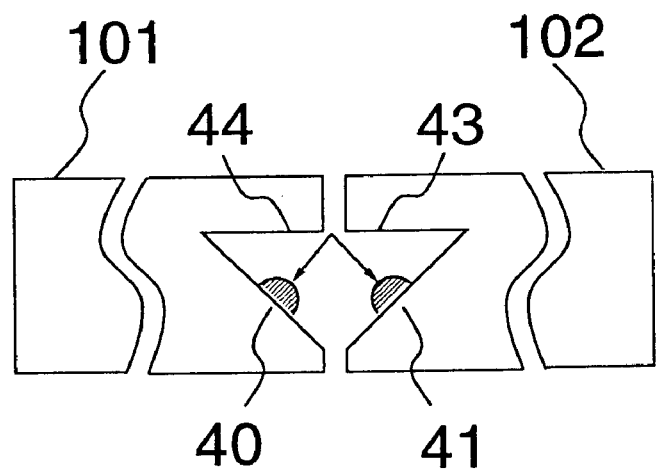
FIGS. 8A and 8B illustrate improvements of FIGS. 7A to 7C.
Figure 8:
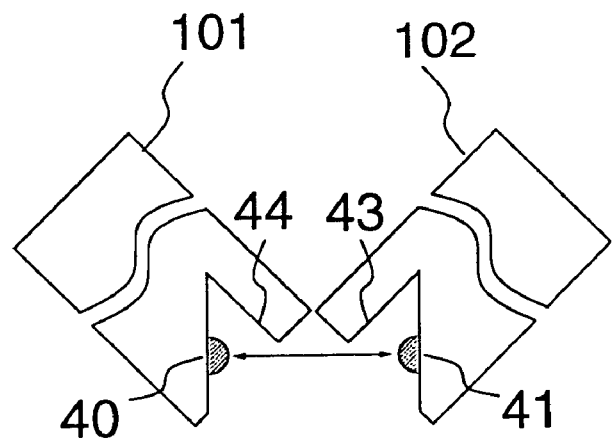

FIGS. 8A and 8B illustrate another example of achieving communication between display devices as shown in FIGS. 7A to 7C. In FIG. 8A, two display devices are coupled at 180° and thus flat as a whole as shown in FIG. 7A. Although optical axes of infrared communication modules 40 and 41 are orthogonal to each other in FIG. 8A, communication is possible owing to reflection by reflection plates 43 and 44. Reflection appears to occur in the gap between reflection plates 43 and 44 in FIG. 8A, however, actually diffusion of light rays occurs at several degrees from the optical axes so that the light rays are reflected from reflection plates 43 and 44 and accordingly communication is possible.

FIG. 8B shows two display devices that are coupled at 90° and thus bent to form a right angle as a whole as shown in FIG. 7B. Since optical axes of infrared communication modules 40 and 41 are arranged to face each other, communication can appropriately be made. FIGS. 8B and 7C differ from each other in the position of the reflection plates. Reflection plate 42 in FIG. 7C is located on the outside of the display devices. Therefore, consideration should be made regarding the method of attaching the reflection plate and the operation of the reflection plate when the angle of coupling changes from 90° to 180°. The approach shown in FIGS. 8A and 8B uses reflection plates which are provided within the bodies of the display devices so as to avoid the above problem.

Figure 11:
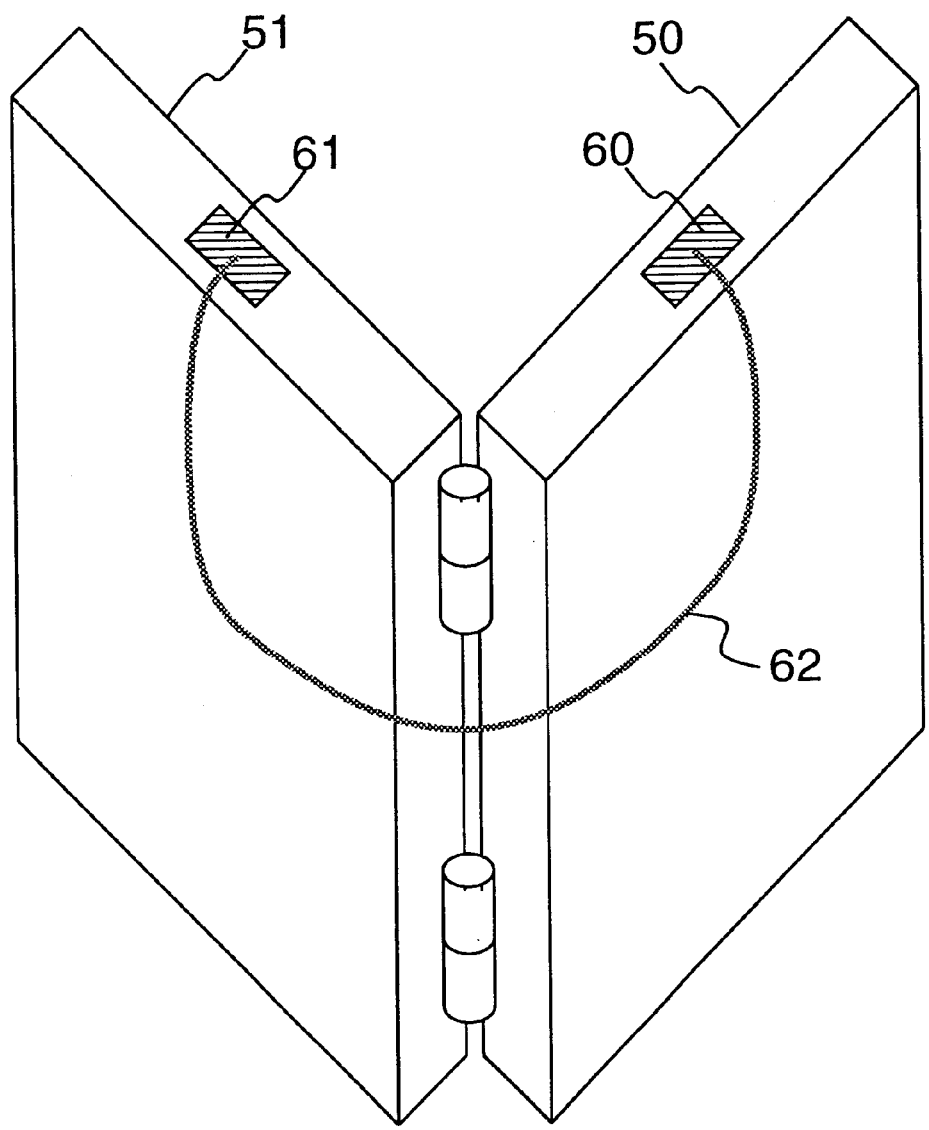
FIG. 11 illustrates communication units implemented by using infrared communication modules and a waveguide.

FIG. 11 illustrates another example of the infrared communication modules for easing the restrictions on the location of the communication modules. Infrared communication modules and a waveguide are used in this example. As shown in FIG. 11, two display devices 50 and 51 have respective infrared communication modules 60 and 61 attached thereto that are incapable of making communication in this arrangement even if display devices 50 and 51 are connected. A waveguide 62 provides optical connection of infrared communication modules 60 and 61. An optical fiber or the like formed of transparent plastic or the like may be used as waveguide 62. In this way, optical communication is possible by using waveguide 62 or the like even if communication is difficult due to the locations of the infrared communication modules in the display devices connected to each other.

Figure 9:
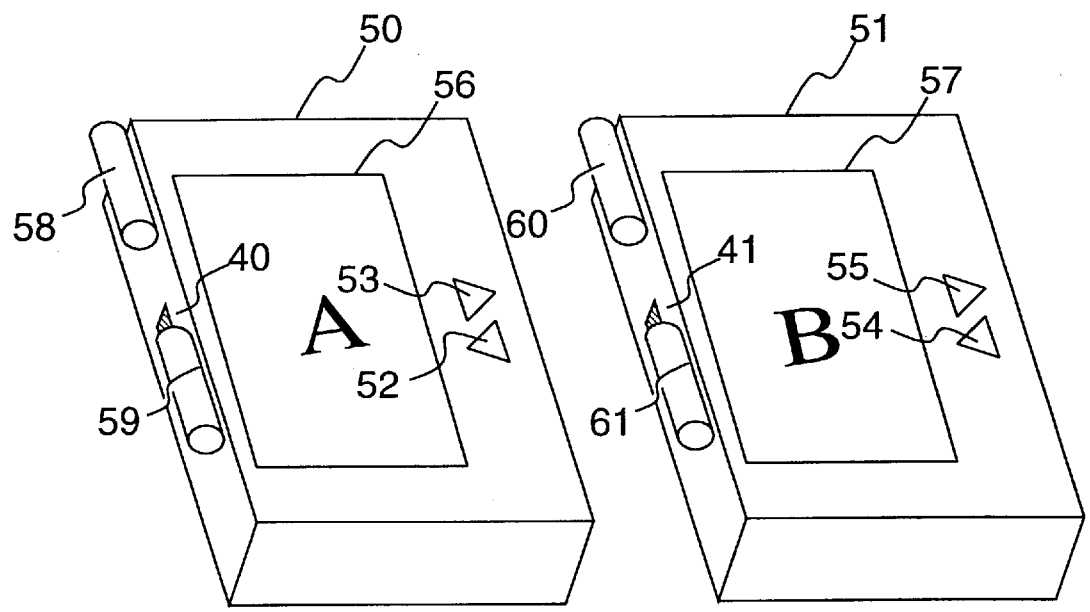
FIGS. 9A and 9B illustrate display devices coupled face to face.
Figure 9:
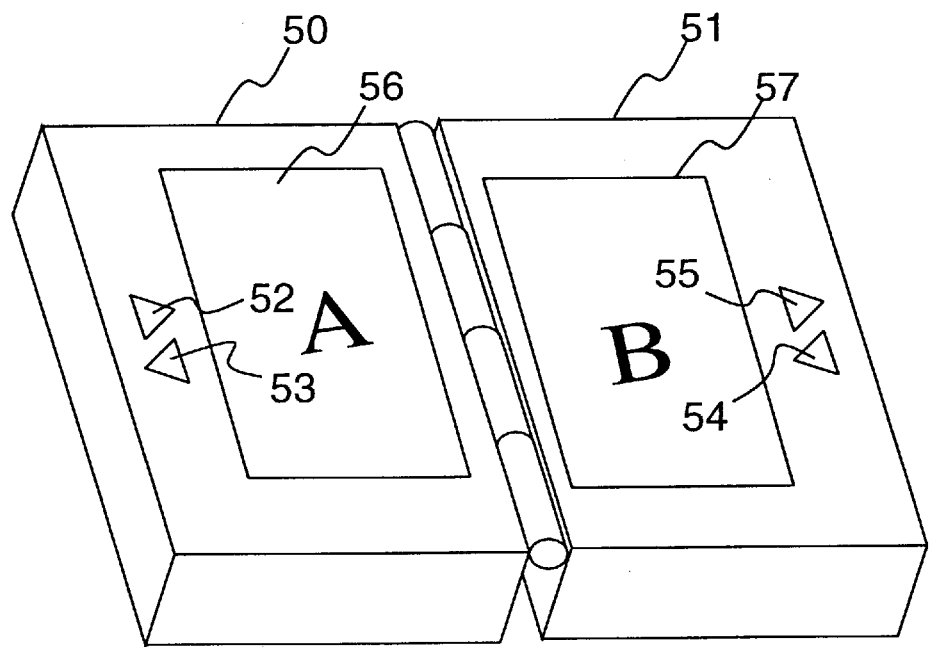

FIG. 9A illustrates two display devices 50 and 51 of the same type which are arranged side by side. Display devices 50 and 51 respectively have infrared communication modules 40 and 41, page-turn buttons 52, 53 and 54, 55, liquid crystal displays 56 and 57, and coupling hinge portions 58, 59 and 60, 61. If display devices 50 and 51 are coupled in this state (direction) by some method, infrared communication modules 40 and 41 do not face each other and they are blocked by display device 50. Therefore, communication is impossible.

In FIG. 9B, display device 50 is rotated 180° and then coupled to display device 51. Consequently, infrared communication modules 40 and 41 face each other so that communication is possible. The display devices of the same type are thus coupled such that respective inter-device communication modules face each other. In this way, communication is possible between display devices of the same type even if each have only one communication module.

If display device 50 is rotated 180° for coupling, display on liquid crystal display 56 may also be rotated 180° to provide a proper natural image.

Letter "A" is displayed on display device 50 in FIG. 9A, while letter "A" on display device 50 in FIG. 9B has been rotated 180°. The raster direction may be reversed when data is transmitted from controller 4 to display device 50 in order to rotate the display by 180°. Alternatively, by some method of generating addresses for reading data from VRAM in display device 50, data may be read in the reverse raster direction. Further, displacement of the longitudinal positions of liquid crystal displays 56 and 57 which could occur when one display device rotates 180° can be eliminated by arranging liquid crystal displays such that each longitudinal position centers on the display device.

The functions of page-turn buttons 52 and 53 can be exchanged when the display device is rotated 180° in order to allow the direction of turning the page (forward or backward) to coincide with the shape and location of the button and accordingly enable convenient use of the device even after the rotation. The functions may be exchanged by hardware by replacing switches of the buttons or the functions may be exchanged by software.

Page-turn buttons 52 and 53 located on the right side in FIG. 9A are located on the left side in FIG. 9B. Then, it is possible to turn the pages with only the left hand, for example.

Figure 10:
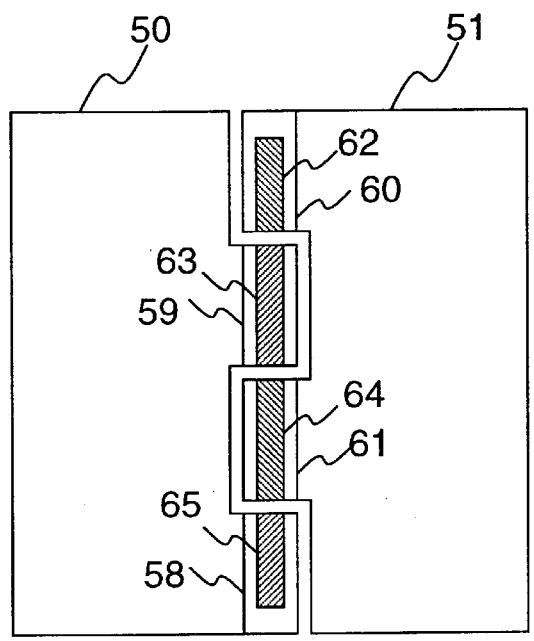
FIGS. 10A and 10B illustrate another method of implementing the coupling unit.
Figure 10:
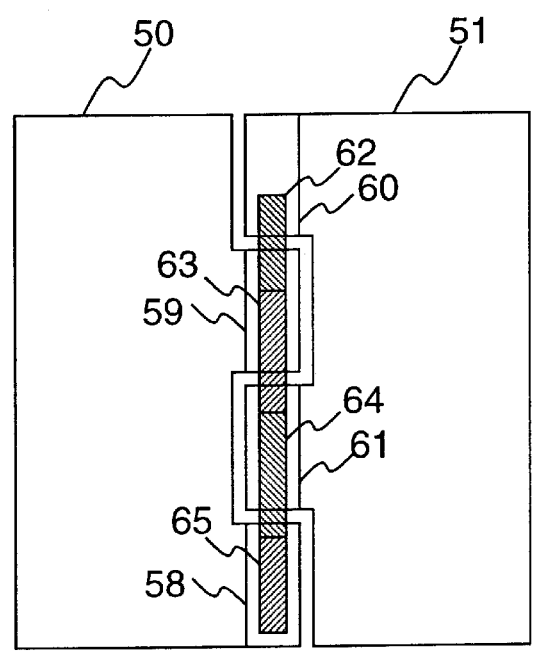

FIGS. 10A and 10B illustrate another method of implementing coupling unit 6. Components in FIGS. 10A and 10B denoted by 50, 51, 58, 59, 60 and 61 correspond to those shown in FIGS. 9A and 9B. The hatched portions 62, 63, 64 and 65 in FIGS. 10A and 10B represent mandrels provided within coupling hinge portions 60, 59, 61 and 58. They are not coupled in the state shown in FIG. 10A. Mandrel 62 is moved downward slightly and mandrel 63 is lightly pushed up. Accordingly, mandrels 64 and 65 are pushed down a little. (Although coupling hinge portions 58, 59, 60 and 61 are slightly spaced apart for the purpose of illustration, the actual gap is far smaller.) At this time, mandrels of one display device enter the coupling hinge portions of the other display device and thus display devices 50 and 51 are coupled (leaving one degree of freedom centering the mandrels as an axis). If mandrels 62 and 65 are made relatively smaller, they would not project from the coupling hinge portions. In this way, one display device is rotated 180° so that display devices can be coupled using the coupling hinge portions of the same type. It is then unnecessary to separately manufacture display devices having coupling units on the right side and those having coupling units on the left side.

Figure 12:
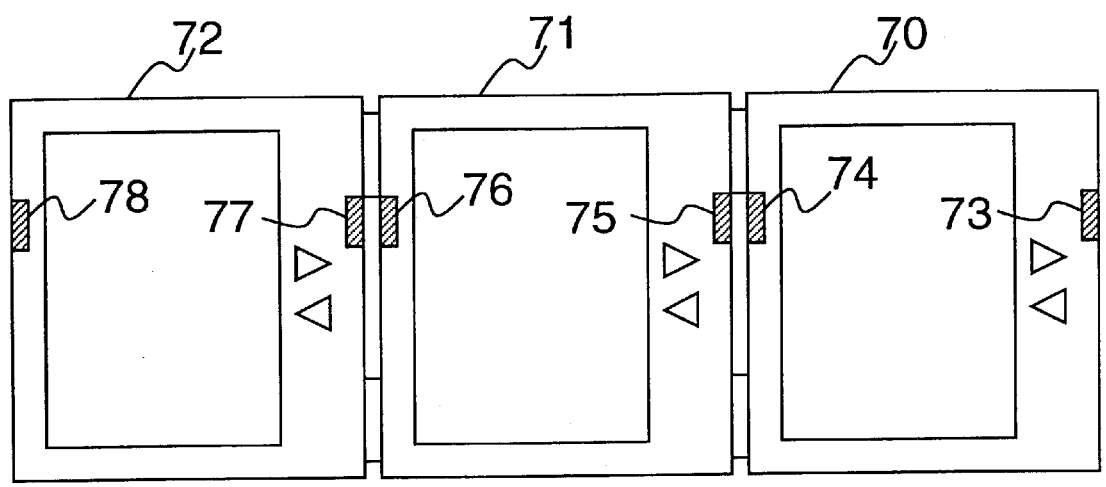
FIG. 12 illustrates three display devices connected side by side.

FIG. 12 illustrates three display devices coupled to each other. Three display devices 70, 71 and 72 respectively have infrared communication modules 73, 74, 75, 76, 77 and 78 on their right and left sides. Display devices 70 to 72 are coupled as shown without being rotated by 180°. Since infrared communication modules 74 and 75 as well as modules 76 and 77 are arranged to face each other, communication is possible in this state.

In the example shown in FIGS. 9A and 9B, one display device is rotated 180° for coupling. Therefore, the communication module must be arranged near the center of the device so as to face the module of the other device. On the other hand, the display devices are connected without being rotated in FIG. 12. In this case, communication modules may be arranged on both of the right and left ends and thus the restrictions on the location of the communication modules can be reduced. Further, at least three display devices can be connected side by side and communication can be made therebetween by providing communication modules on both of the right and left ends. Here, the communication modules are arranged on the right and left ends. However, the modules may be located on both of the top and bottom ends or all of the top, bottom, right and left ends.

Figure 13:
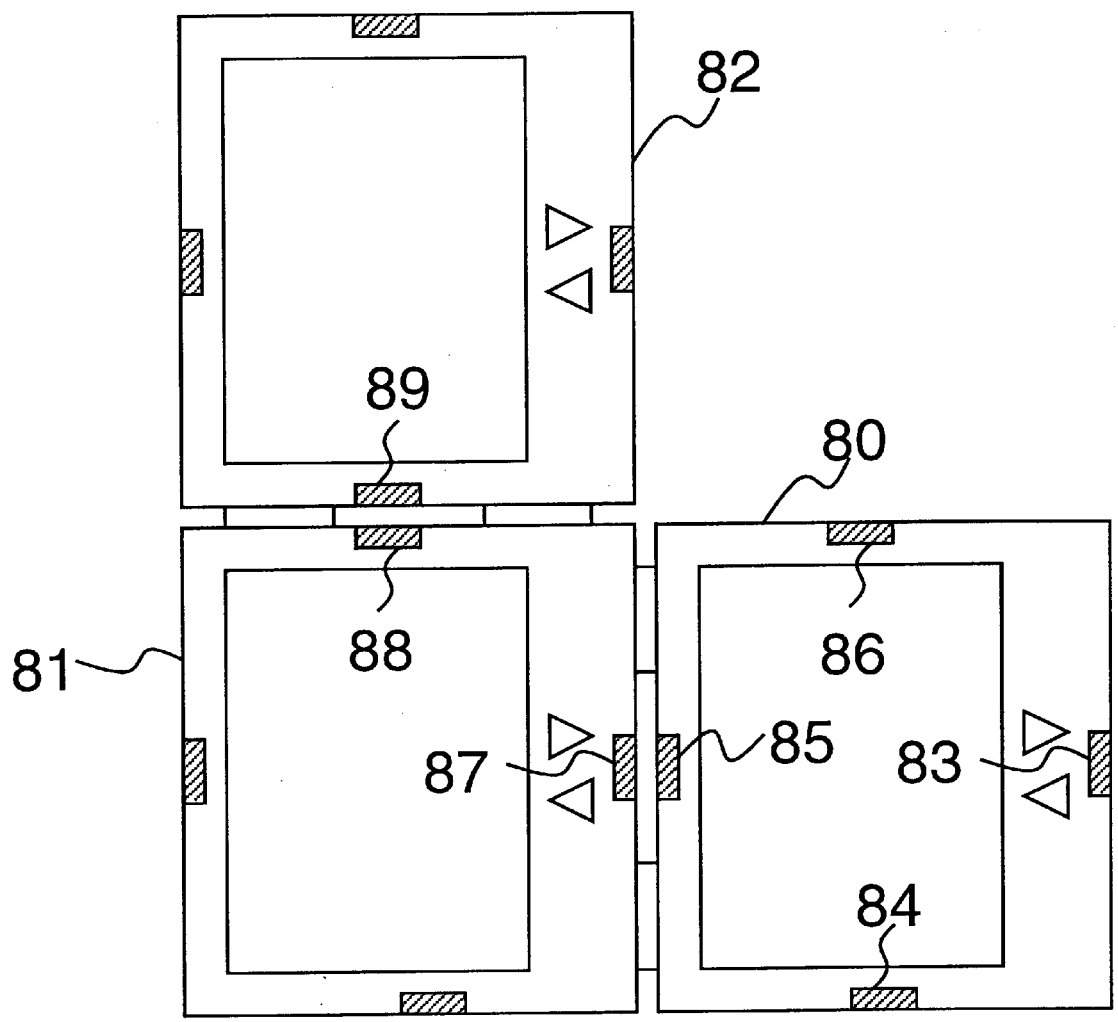
FIG. 13 illustrates display devices coupled to each other, each having communication modules on all of its four sides.

In FIG. 13, communication modules are arranged on all of the four sides. Three display devices 80, 81 and 82 each have infrared communication modules respectively on the top, bottom, right and left ends. When display devices are connected as shown in FIG. 13, communication module 85 faces module 87 and module 88 faces module 89 so that communication is possible. Vertical and lateral connection of three or more display devices can be made freely and communication therebetween is possible by providing communication modules on the top, bottom, right and left ends respectively.

Figure 14:
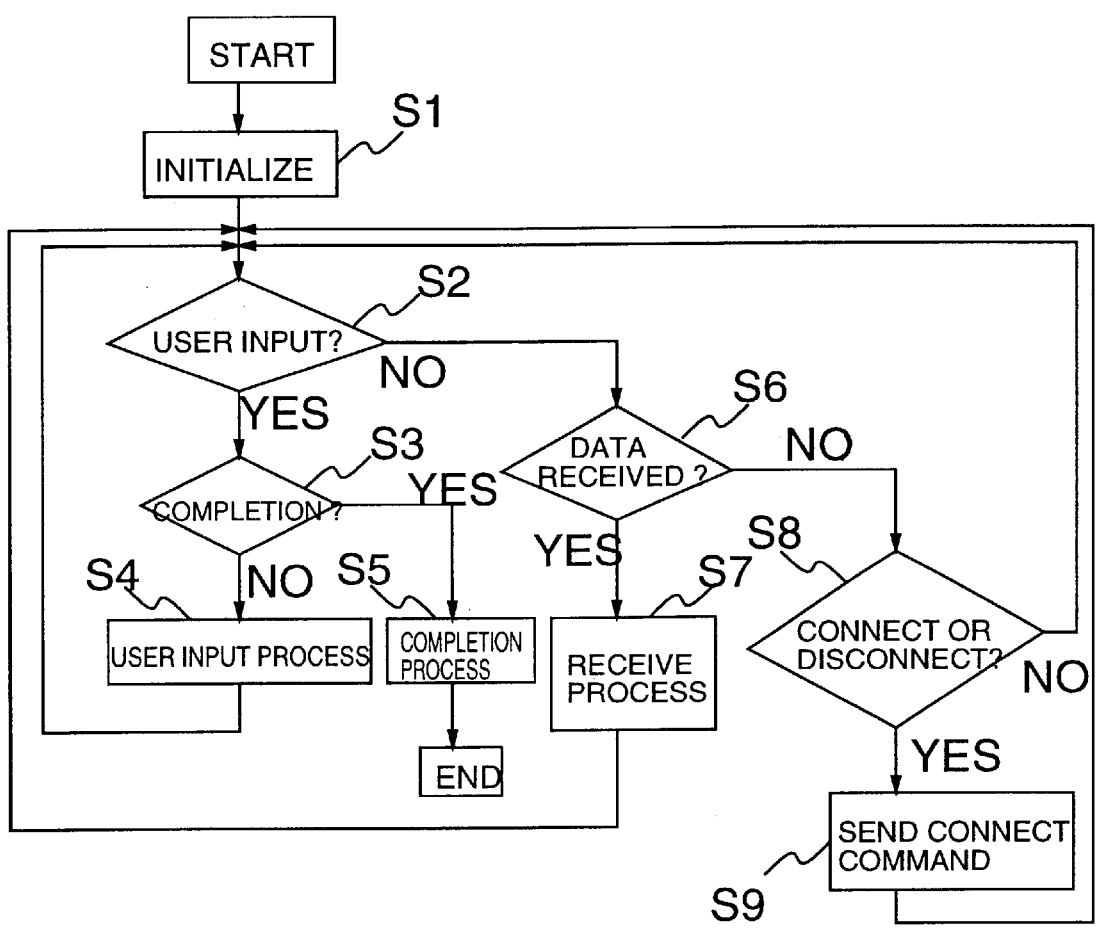
FIG. 14 is a flow chart illustrating details of processing by the display device.

FIG. 14 is a flow chart illustrating a flow of processing by the display device. In the following description, the display device of the present invention is applied to such equipment as an electronic book terminal. The electronic book terminal contains page data arranged in the order of page numbers. The user presses a next page button or a previous page button and accordingly required page data is displayed. The page data is bit map image, text data and the like for example. The page data is uniquely determined by a page ID. The simplest page ID is a page number represented by 4 bytes, for example. In order to designate even a book, 32 bytes including an ISBN (International Standard Book Number) may be used for representing the page ID.

First, in step S1, initialization is performed. For example, the page which was displayed when the last processing was completed is displayed, the number of currently connected devices is checked, and the like. As described later, a designated page display command, for example, is used for displaying a page. A connection check command, for example, is used for checking the number of connected devices.

In step S2, whether or not user input is made by operation unit 3 (FIG. 1) is determined. If the answer is Yes, step S3 is carried out and step S6 is performed if the answer is No. The user input refers to turning off of the power switch button, pressing of the next/previous button, touching of the display unit and the like. In step S3, whether the processing is completed or not is determined. If completed, step S5 is conducted and step S4 is conducted if the processing does not reach completion. The completion refers to turning off of the power switch button or the like.

In step S5, completion processing is done and then this flow attains the end. The completion processing refers to recording of the page number displayed last, actual turning off of the power and the like.

In step S4, input processing except the completion is done and then step S2 is conducted. Here, the input processing refers to transmission of "next page display command" upon pressing of "forward to next page" button, transmission of "previous page display command" upon pressing of "backward to previous page" button, and the like (details discussed below).

In step S6, determination is made if or not received data is sent from inter-device communication unit 5 (FIG. 1). If the answer is Yes, step S7 is performed and if No, step S8 is conducted. In step S7, processing is done according to the received data and then step S2 is conducted. In step S8, determination is made if the display device is connected to or disconnected from another display device. If the answer is Yes, step S9 is conducted and if No, step S2 is performed. In step S9, the connection check command is broadcasted (as described later in conjunction with FIG. 16), and step S2 is conducted.

Figure 15:
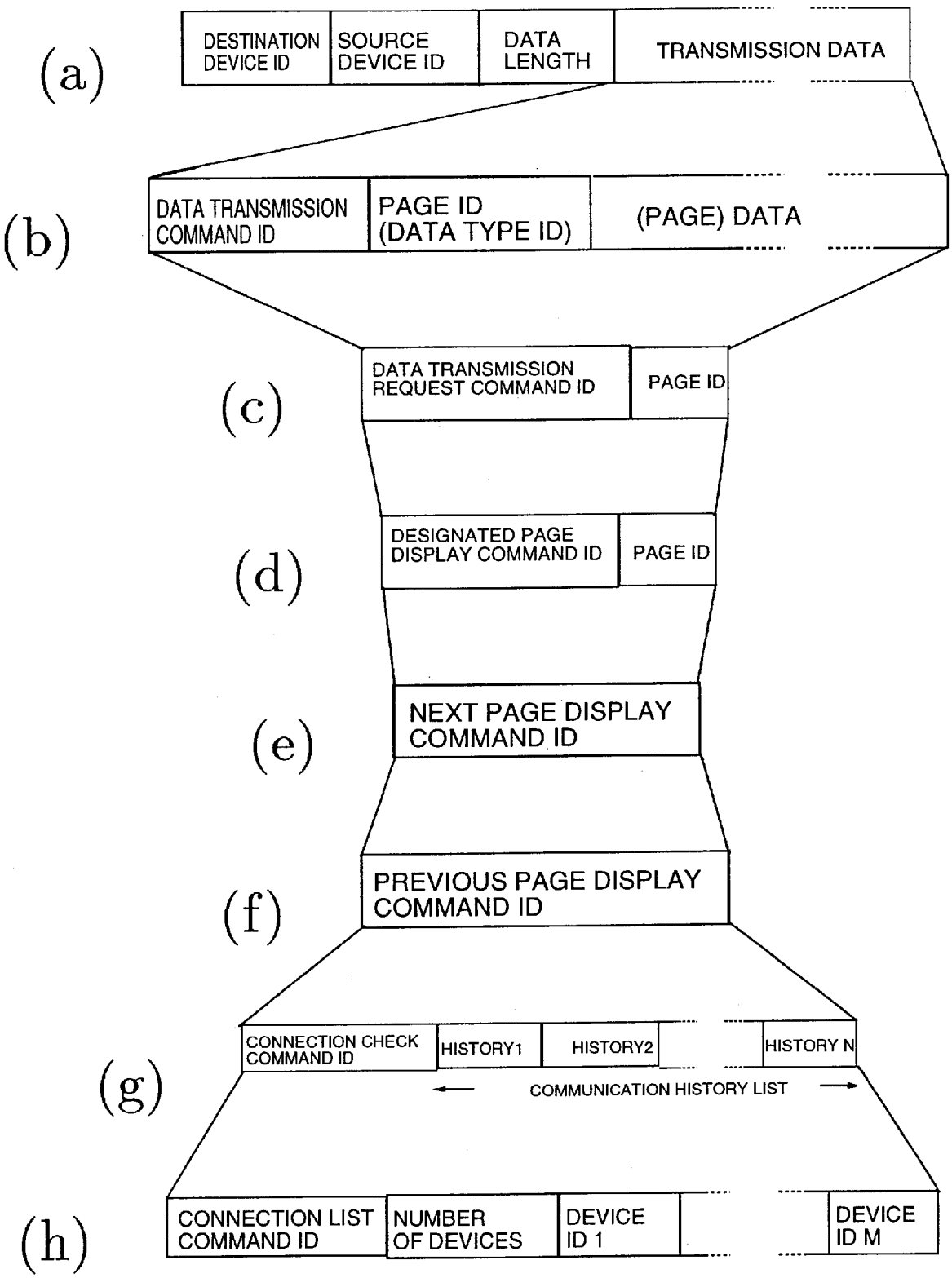
FIG. 15 illustrates a data protocol communicated through communication units.

FIG. 15 illustrates an example of a communication protocol communicated through inter-device communication unit 5. It is noted that low-level communication protocols are not shown here. Specifically, two-way communication based on byte can be implemented by Xon/Xoff, IrDA, USB, IEEE-1394, TCP/IP and the like. Description here is presented regarding a higher protocol.

In (a) of FIG. 15, the entire high communication protocol is shown. ID of a display device to which data is to be transmitted (hereinafter referred to as destination device ID), ID of a display device which transmits data (hereinafter referred to as source device ID), the number of bytes of the following transmission data length, and the transmission data are communicated in this order. The ID of the display device (hereinafter referred to as device ID) is allocated to each display device like MAC (Media Access Control) address of Ethernet card, for example. One ID is never allocated to a plurality of devices. However, 0 has a special meaning as a broadcast ID and it is not allocated to the display device (as described later in conjunction with FIG. 16).

FIG. 15 further illustrates details of the transmission data in (b) to (h). The leading item in the transmission data represents a command ID. For example, ID numbers representing "data transmission command," "data transmission request command," "designated page display command," "next page display command," "previous page display command," "connection check command," "connection list command" and the like are stored. In this way, control instructions can be communicated between display devices.

Figure 16:
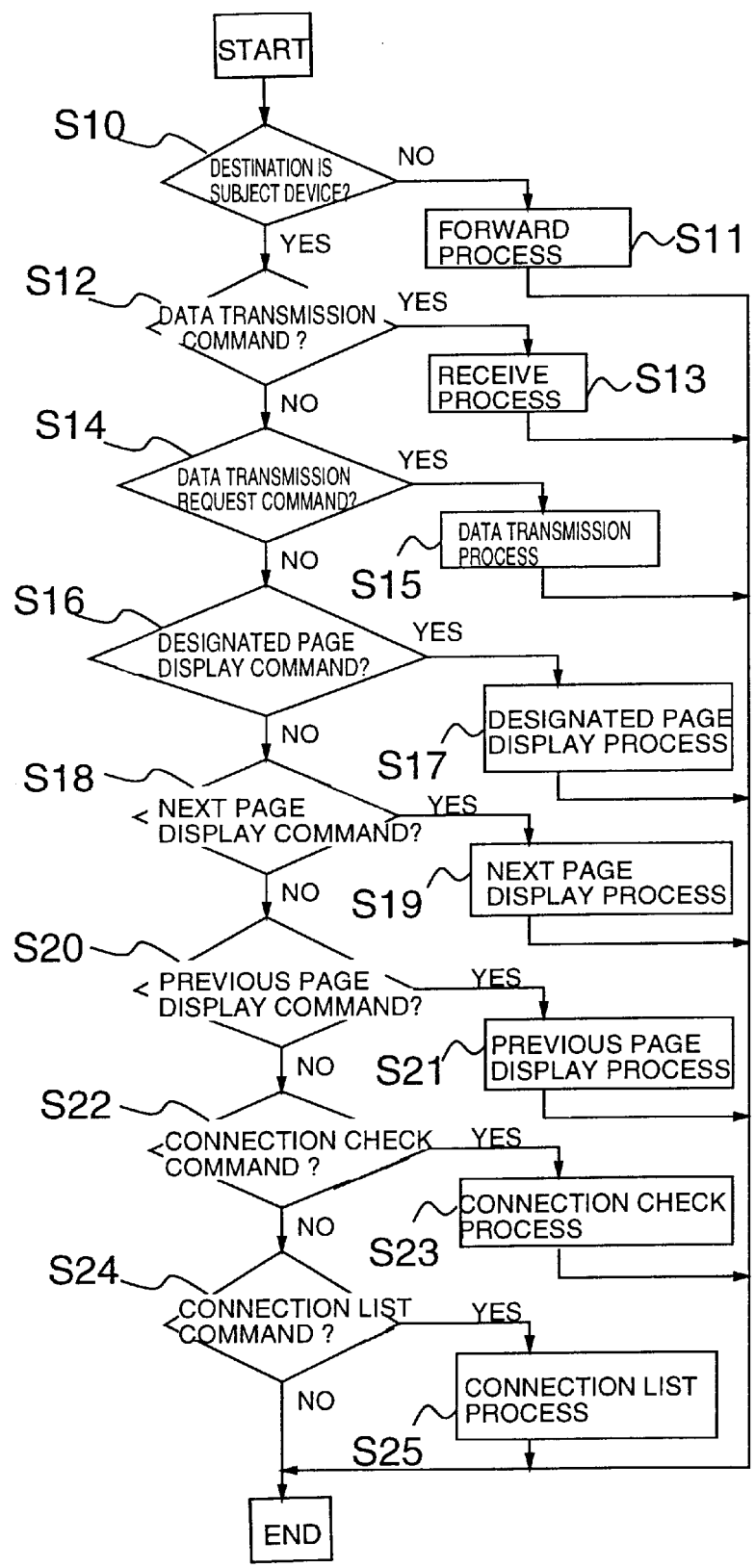
FIG. 16 is a flow chart illustrating details of step S7 in FIG. 14.

FIG. 16 is a flow chart illustrating step S7 in FIG. 14. Respective operations are done according to respective commands shown in (b) to (h) in FIG. 15. In step S10, determination is made on whether or not received data is destined for the subject device. (The subject device refers to the one which follows this flow chart now). If the answer is Yes, step S12 is conducted and if No, step S11 is performed. This determination is done by checking if the destination device ID in (a) of FIG. 15 is the same as the device ID of the subject device. If the device ID is 0, it is the broadcast ID regarded as the one for all of the connected devices, and step S12 is then performed.

In step S11, the received data is directly transmitted to all display devices connected to the subject device except the display device which has directly transmitted the data. This operation is hereinafter referred to as "forward." After the forward, this flow reaches the end.

In step S12, whether or not a received command ID is "data transmission command ID" is determined. If so, step S13 is conducted and if not, step S14 is conducted. In step S13, the page ID and page data following the data transmission command ID as shown in (b) in FIG. 15 are stored in a local recording unit (e.g. HDD, memory).

In step S14, whether or not the received command ID is "data transmission request command ID" is determined. If so, step S15 is conducted, and if not, step S16 is conducted.

In step S15, determination is made as to whether or not page data represented by the page ID following the data transmission request command ID as shown in (c) in FIG. 15 is stored in the local recording unit. If the answer is Yes, that page data is transmitted by using a data transmission command. If the answer is No, forward to other devices as shown in step S11 is done when the destination device ID is the broadcast ID. If the destination device ID is not the broadcast ID, no processing is done. Transmission of data of the broadcast ID is hereinafter referred to as "broadcast."

After the processing above, this flow reaches the end. If transmission is done by the data transmission command, the destination device ID may be a source device ID in the received data and the source device ID may be the device ID of the subject display device. Following this, the sum of the number of bytes of command ID, page ID and page data is added. Further, data transmission command ID, page ID and page data are attached.

Although the page ID and page data are communicated in steps S13 and S15, other various data may be communicated. For example, the section corresponding to the page ID may be data contents ID so that the source and destination devices can identify. If data is encrypted data, for example, a cipher key may be transmitted from another device.

In step S16, whether or not the received command ID is "designated page display command ID" is determined. If the answer is Yes, step S17 is done and if No, step S18 is performed.

Figure 18:
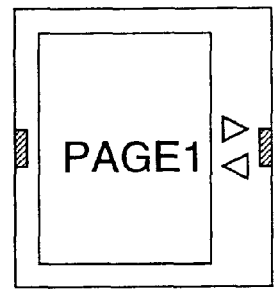
Figure 18:
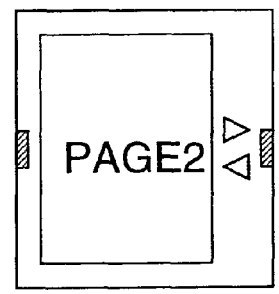
Figure 18:
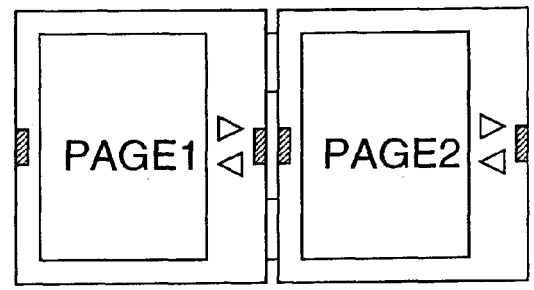
Figure 18:
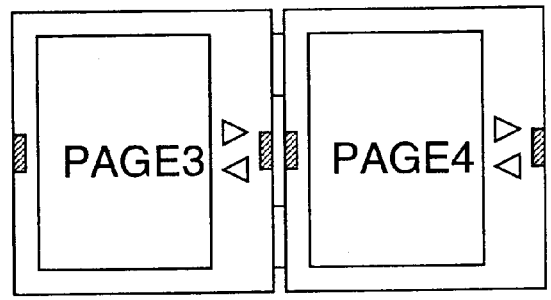
Figure 18:
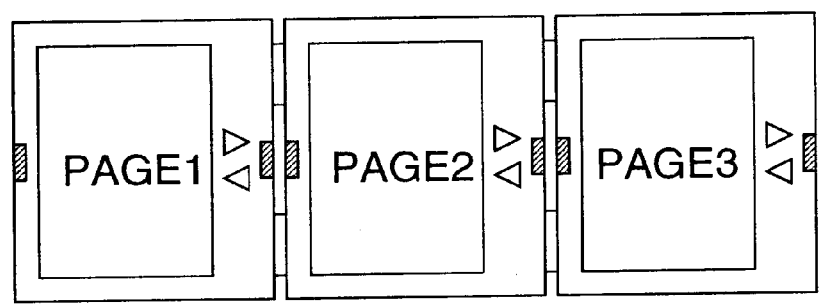
Figure 18:
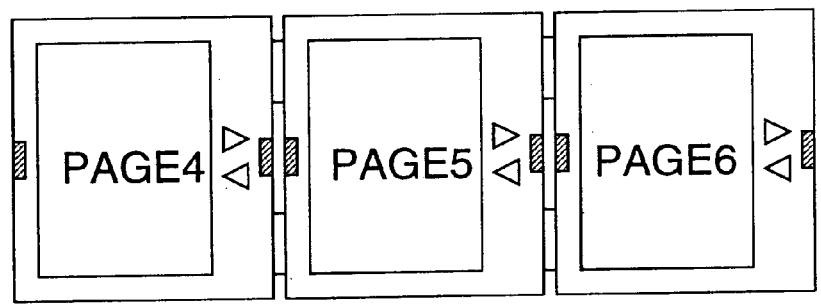
Figure 18:
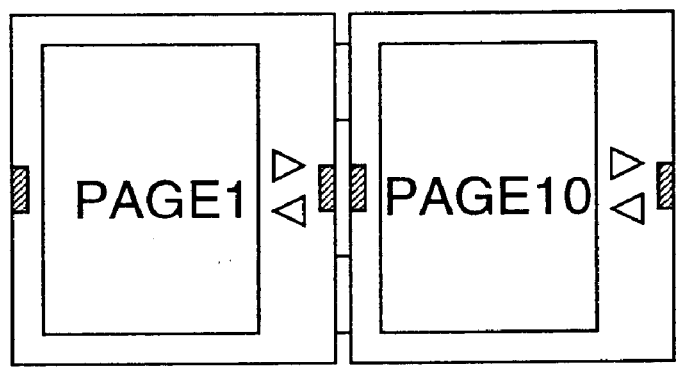

In step S17, page data designated by page ID following the data transmission request command ID as shown in (c) in FIG. 15 is obtained from data acquiring unit 1 and the data is displayed on display unit 2. If control can be made such that the designated page is displayed on another display device, consecutive pages can be displayed on a plurality of display devices and appropriate pages can be displayed according to the page-turn button as illustrated in FIGS. 18A to 18G. Further, display shown in FIG. 18G can be realized by controlling the operation such that information (page 10) regarding page 1 which is displayed together with page 2 as shown in FIG. 18C is displayed on the adjoining display device.

In step S18, whether or not the received command ID is "next page display command ID" is determined. If the answer is Yes, step S19 is performed and step S20 is performed if the answer is No. In step S20, whether or not the received command ID is "previous page display command ID" is determined. If the answer is Yes, step S21 is conducted and step S22 is conducted if the answer is No.

In step S22, whether or not the received command ID is "connection check command ID" is determined. If the answer is Yes, step S23 is performed and step S24 is performed if the answer is No. In step S24, whether or not the received command ID is "connection list command ID" is determined. If the answer is Yes, step S25 is conducted. If the answer is No, this flow reaches the end.

Figure 17:
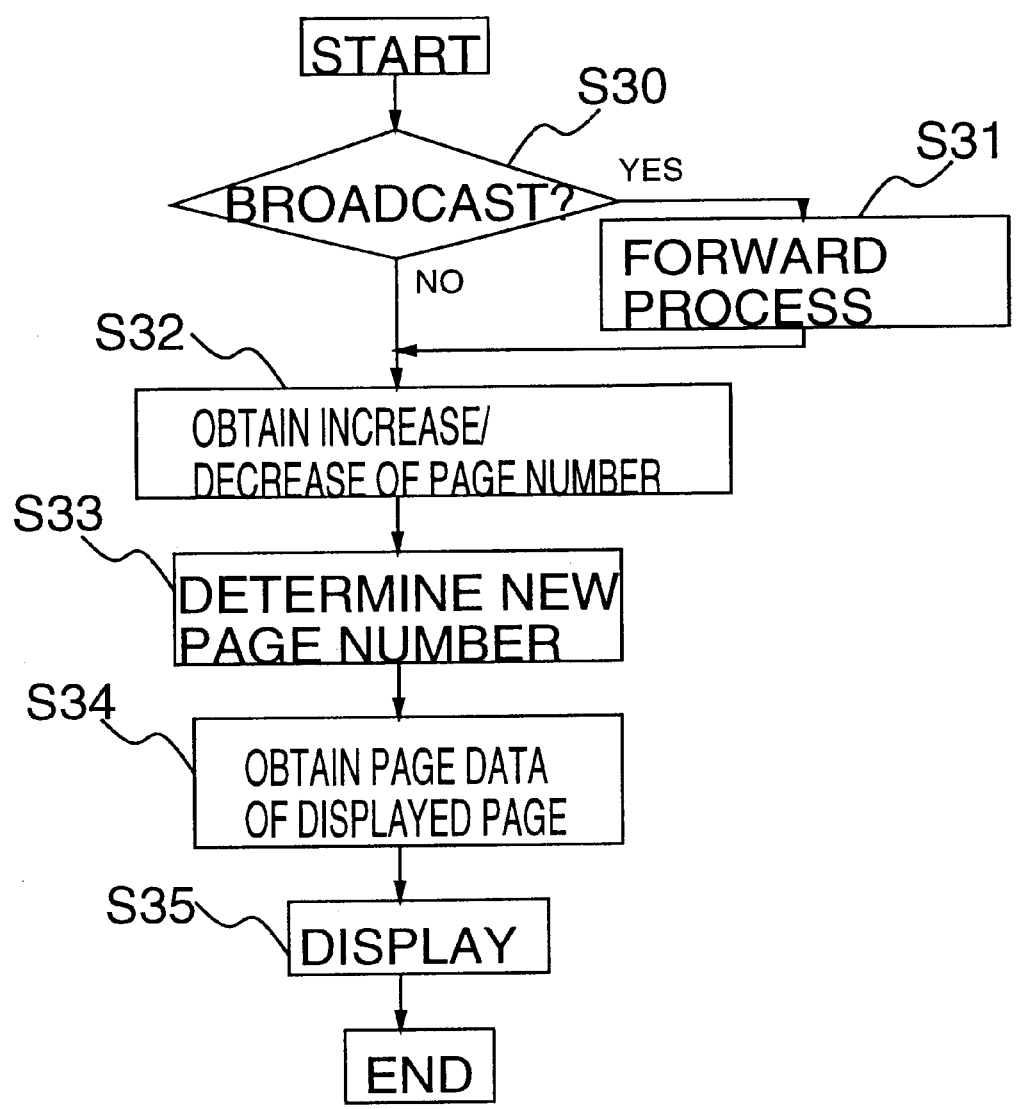
FIG. 17 is a flow chart illustrating details of step S19 in FIG. 16 FIGS. 18A to 18G illustrate a plurality of display devices coupled to each other which display consecutive data in a manner shown.

FIG. 17 is a flow chart illustrating step S19 in FIG. 16. It is noted that the next page display command consists of only the command ID as found in (e) of FIG. 15. In step S30, if the destination device ID is the broadcast ID, step S31 is done. If not, step S32 is performed. In step S31, the next page command is forwarded and step S32 is then performed. In step S32, the number of increase/decrease of the page number is obtained and then step S33 is performed. The number of increase/decrease of the page number can be known by the number of currently connected display devices. In the case of the next page, the number is directly equal to the number of display devices. The number of display devices can be obtained by means of the connection check command and the connection list command.

In step S33, page ID of a page to be displayed newly is determined. The displayed page may be the one preceding or following the currently displayed page on the subject device by the number of increase/decrease of the page number. For example, suppose that the page ID is represented by the page number, the page ID of the page currently displayed on the subject device is 4, and the number of increase/decrease of the page number is 2 (i.e. two display devices are connected). In this case, the page ID of the page to be displayed is 4+2=6. In step S34, page data in the newly displayed page is obtained from page acquiring unit 1 and then step S35 is performed. In step S35, the obtained page data is displayed on display unit 2 and this flow attains the end.

By step S19 (step S30 to step S35), when a plurality of display devices are coupled, an appropriate page can be displayed according to the number of coupled devices upon pressing of "next button" for example.

FIGS. 18A to 18G specifically illustrate this. Suppose that there is only one display device which displays page 1 as shown in FIG. 18A. When the next button is pressed, page 2 is displayed as shown in FIG. 18B since the number of increase/decrease of the page number is 1. Suppose that two display devices are coupled as shown in FIG. 18C that display page 1 and page 2 respectively. When the next button is pressed, page 3 and page 4 are displayed as shown in FIG. 18D since the number of increase/decrease of the page number is 2.

Next, suppose that three display devices are coupled as shown in FIG. 18E that display page 1, page 2 and page 3 respectively. When the next button is pressed, page 4, page 5 and page 6 are displayed as shown in FIG. 18F since the number of increase/decrease of the page number is 3. If the rightmost display device displaying page 3 in FIG. 18E is detached, this state corresponds to FIG. 18C. When the device is decoupled, the number of coupled devices is counted again and corrected to 2. If the next page button is pressed now, page 3 and page 4 are displayed as shown in FIG. 18D instead of page 4 and page 5 since the number of connected display devices or the number of increase/decrease of page number is set to 2. In this way, the page is forwarded or returned by the number of coupled display devices. Even if the number of display devices dynamically changes, successive pages can be displayed without missing of the page or display of the previous page.

The similar function can be obtained by designating a server display device which controls which page is displayed by which display device and sending a designated page display command individually to each device. However, if four display devices are coupled in series, for example, and they are divided at the center into two groups consisting of two devices, one of the groups has no server display device. In this case, a server display device is newly designated.

If the user presses the next page button of the display device which is not the server display device, the server display device is informed of the fact that the next page button is pressed and then the server display device thus informed issues a plurality of commands to respective display devices so as to achieve a desired display. Step S21 is almost the same as step S19 except that the representation changes from "next page" to "previous page." Another difference is the number of increase/decrease of the page number. Specifically, the number is negative (–(number of display devices)).

Figure 19:
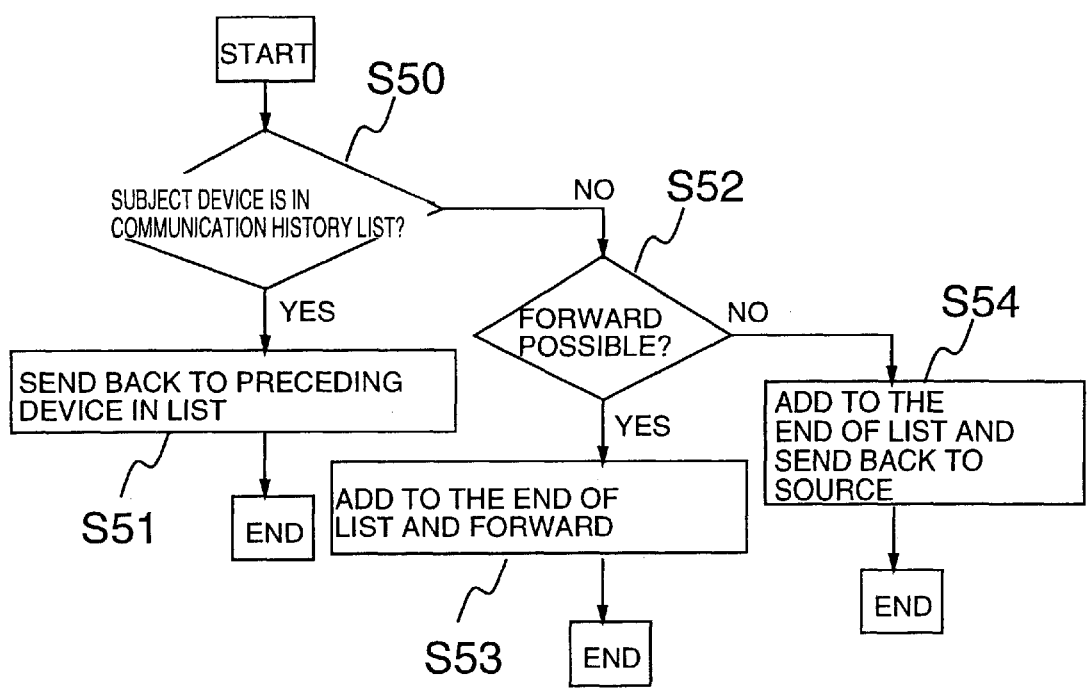
FIG. 19 illustrates details of step S23 in FIG. 16.

FIG. 19 illustrates step S23 in FIG. 16. In step S50, whether or not the subject device ID is in a communication history list (described later) is determined. If the answer is Yes, step S51 is conducted and step S52 is conducted if the answer is No. As shown in (g) in FIG. 15, the connection check command has a list of device IDs following the connection check command ID. The communication history list consists of IDs of display devices to which the connection check command has been transmitted and forwarded and accordingly represents the history (path) of communication.

In step S51, since the connection check command has already passed through the subject device once, the communication check command is directly sent to the display device ID preceding the subject ID in the communication history list, and then this flow reaches the end.

In step S52, whether or not there is a display device to which forward is done is determined. If the answer is Yes, step S53 is conducted and step S54 is conducted if the answer is No. In step S53, the subject device ID is added to the end of the communication history list and the list is forwarded, and then this flow reaches the end. Step S54 corresponds to the end of the communication path since there is no display device to which forward is done. Accordingly, the subject device ID is added to the end of the communication history list to be returned to the source display device, and the flow attains the end.

Figure 20:
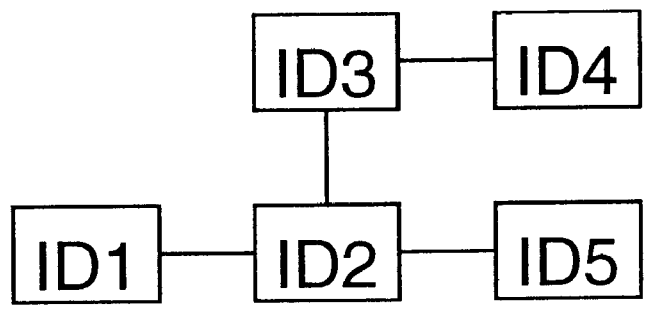
FIGS. 20A and 20B illustrate display devices coupled to each other in a manner shown.
Figure 20:
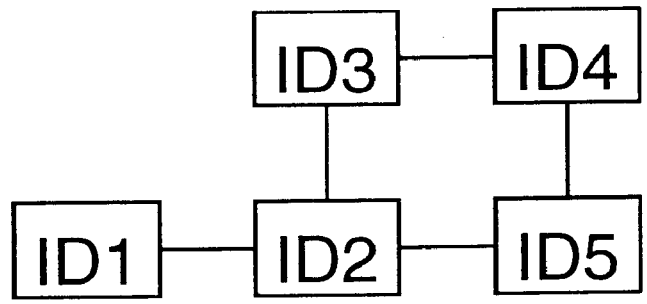

For example, suppose that five display devices are coupled as shown in FIG. 20A and a connection check command is transmitted from the display device denoted by ID1. At the time of transmission, only the source device "1" is in the communication history list. Display device ID2 forwards the communication list to display devices ID3 and ID5 since the communication list does not include ID2. At this time, the communication history list has "1, 2." As there is no ID3 in the communication history list, display device ID3 forwards it to display device ID4. At this time, the communication history list has "1, 2, 3." Although the communication list does not have ID4, there is no device to forward the list, therefore, display device ID4 adds ID4 to the end of the communication history list and returns it to display device ID3. At this time, the communication history list has "1, 2, 3, 4." Similarly, display device ID5 returns the list back to display device ID2. At this time, the communication history list has "1, 2, 5."

Since the communication history list has ID3, display device ID3 returns the list to display device ID2 which precedes 3 in "1, 2, 3, 4." Similarly, display device ID2 returns the list back to display device ID1. Display device ID1 thus receives two kinds of returned communication history lists, "1, 2, 3, 4" as shown in (a) in FIG. 21 and "1, 2, 5" as shown in (b) in FIG. 21.

Figure 22:
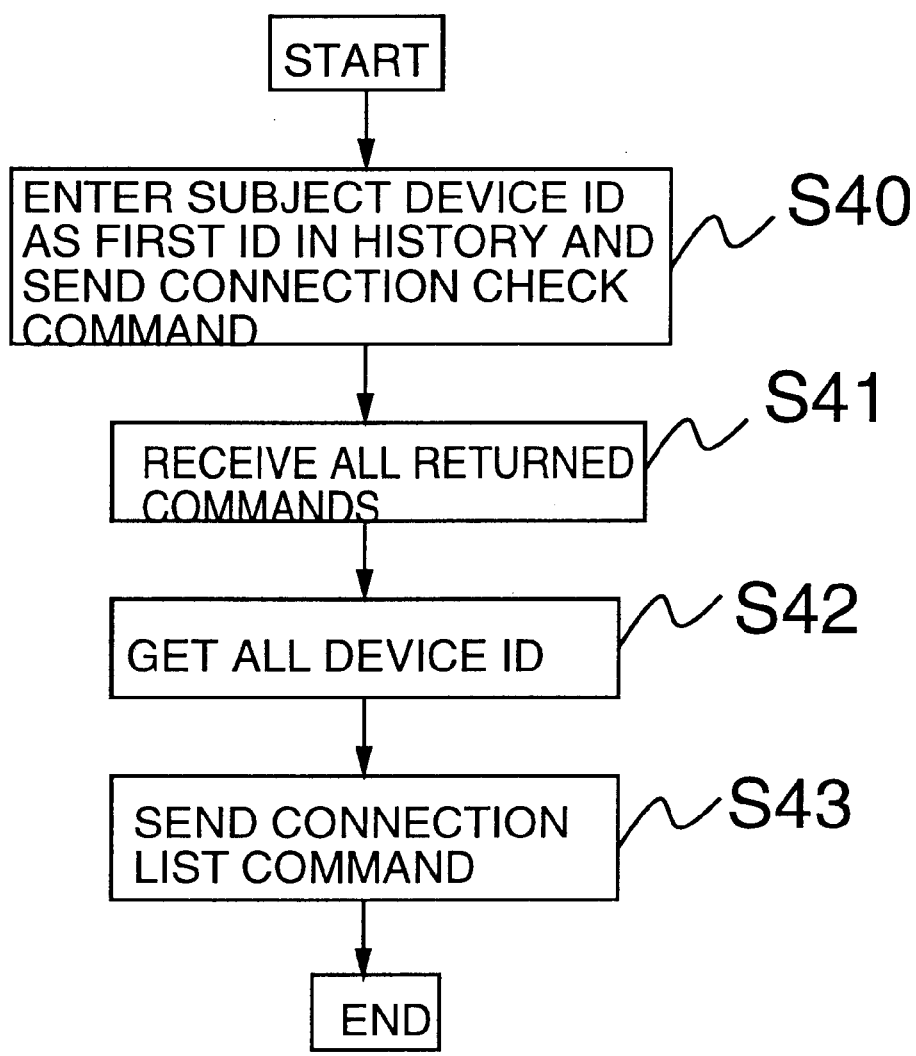
FIG. 22 is a flow chart illustrating a connection check command transmitted by the display device.

FIG. 22 is a flow chart of a display device (subject display device) which transmits the connection check command. In step S40, the subject display device enters its device ID as the first device ID in the history, and broadcasts the connection check command to all devices connected thereto. In step S41, the display device receives all of the returned connection check commands.

Figure 21:
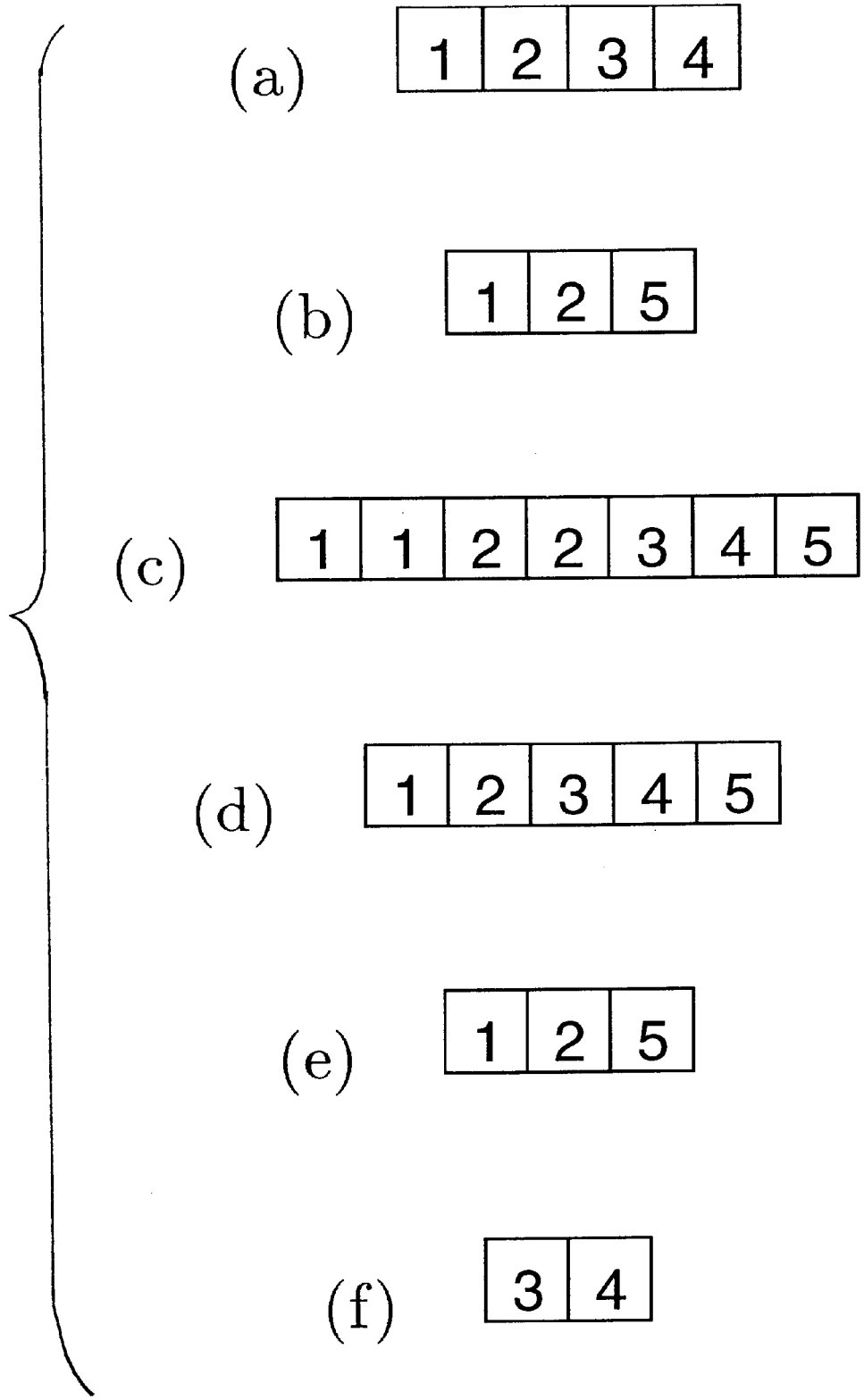
FIG. 21 illustrates processing concerning a communication history list.

As explained in conjunction with FIG. 19, the connection check command returns to the source display device. If display device ID1 in FIG. 20A transmits the connection check command, the communication history lists shown in (a) and (b) in FIG. 21 are returned. There is no means for perfectly confirming whether or not all connection check commands are returned. However, the processing of the connection check command is not so troublesome and the communication is done instantly. Therefore, an appropriate timeout may be secured to shorten the reception processing.

In step S42, a list of all device IDs is obtained. In order to obtain the list simply, communication histories of all of the returned commands are merged and sorted. (C) in FIG. 21 illustrates that the IDs are sorted based on ID numbers. After the sorting, the overlapping of the ID numbers is eliminated so as to obtain all IDs of the coupled devices which are sorted. (D) in FIG. 21 illustrates that the overlapping ID numbers are eliminated. Then, the number of devices in the list is counted. In (d) of FIG. 21, the number is 5.

In step S43, the connection list command is broadcasted. The connection list command may be formed of the connection list command ID, the number of connected devices, and the list of device IDs arranged in this order. The number of devices and the list are obtained in step S42.

In step S9 in FIG. 14, the connection check command is broadcasted when connection or disconnection is made. For example, suppose that devices ID2 and ID3 in FIG. 20A are disconnected. Then, display devices ID2 and ID3 respectively transmit connection check commands. Consequently, display device ID2 obtains the display device list as shown in (e) in FIG. 21 and display device ID3 obtains the display device list as shown in (f) in FIG. 21. In this way, the correct number of connected display devices can be obtained after disconnection is made.

On the contrary, suppose that the disconnected display devices ID2 and ID3 are coupled again. Display devices ID2 and ID3 respectively transmit connection check commands. If a display device is newly connected, one of the connected display devices may transmit the connection check command. Even if both devices transmit the commands, the result is the one as shown in (d) in FIG. 21 and thus no problem occurs.

Accordingly, coupling and decoupling are automatically conveyed to all display devices so that all of the display devices can recognize which display devices are currently coupled. Since the coupling status is known, this information can be used for designation of the destination in (a) of FIG. 15 and can be used for determining the number of increase/decrease of the page number in step S32 of FIG. 17.

Figure 23:
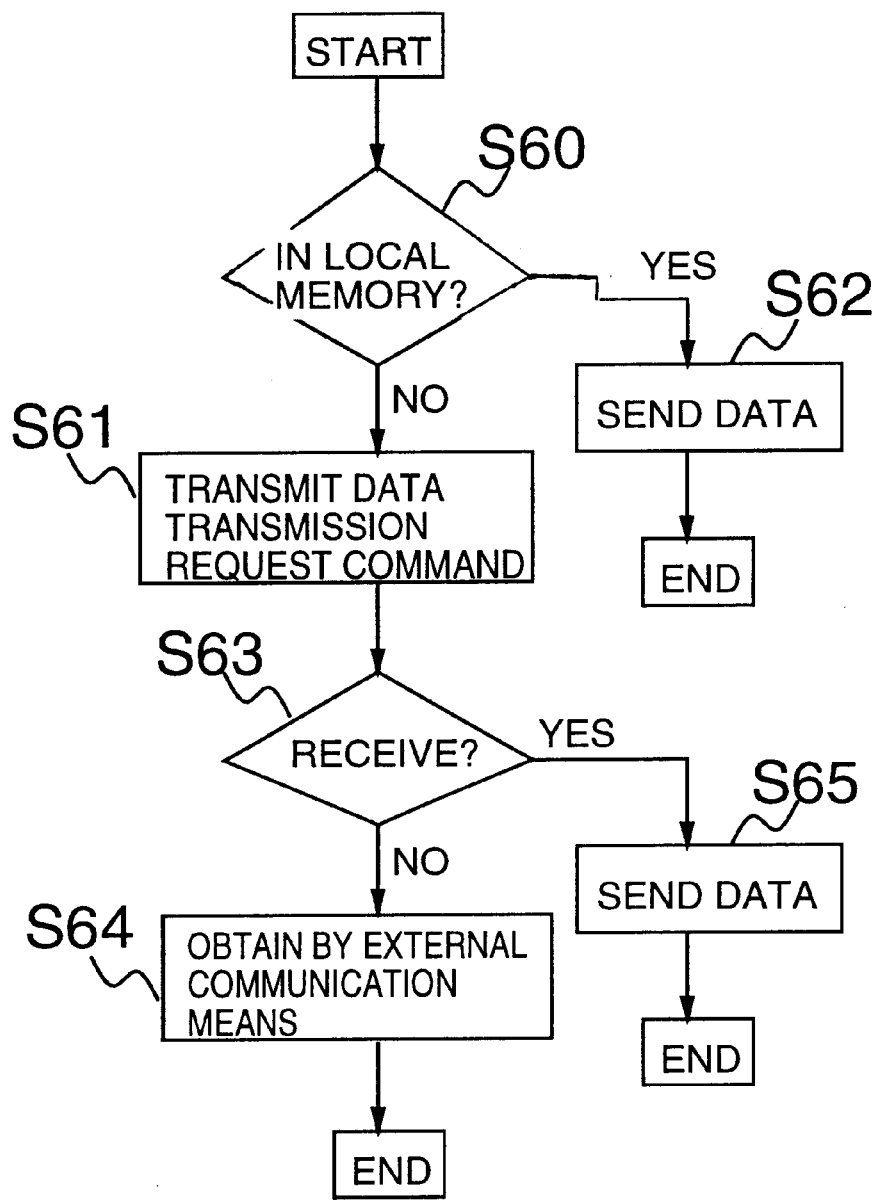
FIG. 23 is a flow chart illustrating an operation of a data acquiring unit.

FIG. 23 is a flow chart illustrating details of the processing by data acquiring unit 1 in FIG. 1. In step S60, determination is made on whether or not a required data is in a local memory. If the answer is Yes, step S62 is conducted and step S61 is conducted if the answer is No. The required data could be designated by page ID, for example, or designated by file name. Any method of designation may be employed depending on the purpose. If the page ID is used, it can be handled on an existing file system having a conversion table of the page ID and file name, for example.

In step S62, the required data is passed from the local memory to controller 4 and this flow reaches the end. In step S61, since the data is not stored in the local memory, whether or not another connected display device holds the data is asked. Specifically, the data transmission request command shown in (c) in FIG. 15 is broadcasted. After the broadcasting, step S63 is conducted.

In step S63, reply of the data transmission request command in step S61 is waited. As step S41 in FIG. 22, a proper timeout may be set to wait for return of the data transmission command. If the data transmission command of the required data is returned in a set period of time, step S65 is conducted. If not, step S64 is performed. In step S65, the received data is passed to controller 4 and this flow reaches the end.

In step S64, data is obtained from any external unit by using external communication means contained in data acquiring unit 1. The external communication means is a modem or Ethernet cable, for example. If TCP/IP protocol can be used on the modem or Ethernet cable, data can be acquired from FTP (File Transfer Protocol) server by using FTP. If data can be obtained, the received data is passed to controller 4 to complete the flow.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display device for displaying data comprising:
   data acquiring means for acquiring data;
   display means for displaying the data acquired by said data acquiring means;
   operation means for operating said display device;
   control means for controlling said display device;
   infrared communication means for communicating with another display device;
   side surface coupling means for structurally coupling a side surface of said display device to a side surface of said another display device with which communication is made by said infrared communication means; and,
   wherein said side surface coupling means comprises a hinge structure located on one edge of said side surfaces and said infrared communication means are located in said side surfaces adjacent the hinge structure;
   wherein said infrared communication means comprises a pair of infrared communication modules respectively located in mutually opposing recesses of said side surfaces and having optical axes substantially aligned in a first positional arrangement of said display devices and substantially misaligned in a second positional arrangement of said display devices.

2. The display device according to claim 1 wherein said first positional arrangement comprises an arrangement wherein said display devices are coupled at substantially 180° so as to provide a flat planar arrangement of said display devices and wherein said second positional arrangement comprises one or more angulated arrangements wherein said display devices are coupled at substantially 90° or at a position substantially less than 180°, and including infrared reflection means for providing coupling between the infrared communications modules during said second positional arrangement.

3. The display device according to claim 2 wherein said reflection means comprises a reflection plate extending between the other edge of said side surfaces.

4. The display device according to claim 1 wherein said recesses include a pair of substantially flat inner side walls intersecting at an acute angle, wherein said modules are located on one side wall of said pair of side walls and said first positional arrangement comprises an angulated arrangement wherein said display devices are coupled at substantially 90° or at a position substantially less than 180°, said one side walls of said pair of inner side walls facing each other thereat and wherein said second positional arrangement comprises an arrangement wherein said display devices are coupled at substantially 180° so as to provide a flat planar arrangement and including reflection means for providing coupling between said modules during said second positional arrangement.

5. The display device according to claim 4 wherein said reflection means comprises reflection means located on the other side walls of said pair of side walls.

6. The display device according to claim 5 wherein said reflection mans comprise reflection plates on said other side walls.

7. The display device according to claim 4 wherein said acute angle of said pair of inner walls of said recesses is about 45°.

* * * * *